United States Patent
Jiao et al.

(10) Patent No.: US 11,414,338 B2
(45) Date of Patent: Aug. 16, 2022

(54) MICROWAVE HEATING GLASS BENDING PROCESS

(71) Applicant: PPG Industries Ohio, Inc., Cleveland, OH (US)

(72) Inventors: Yu Jiao, Blawnox, PA (US); Russell W. Schrier, Oakmont, PA (US); Chao Yu, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 119 days.

(21) Appl. No.: 16/689,461

(22) Filed: Nov. 20, 2019

(65) Prior Publication Data

US 2020/0087191 A1    Mar. 19, 2020

Related U.S. Application Data

(63) Continuation of application No. 14/819,849, filed on Aug. 6, 2015, now Pat. No. 10,526,232, which is a
(Continued)

(51) Int. Cl.
| | | |
|---|---|---|
| C03B 23/023 | (2006.01) | |
| C03B 35/20 | (2006.01) | |
| C03B 29/08 | (2006.01) | |
| C03B 35/18 | (2006.01) | |
| C03B 40/00 | (2006.01) | |
| C03B 23/025 | (2006.01) | |
| C03B 25/08 | (2006.01) | |
| C03B 35/16 | (2006.01) | |

(52) U.S. Cl.
CPC ...... *C03B 23/0235* (2013.01); *C03B 23/0258* (2013.01); *C03B 25/08* (2013.01); *C03B 29/08* (2013.01); *C03B 35/187* (2013.01); *C03B 35/202* (2013.01); *C03B 40/005* (2013.01); *C03B 35/16* (2013.01); *C03B 2225/02* (2013.01)

(58) Field of Classification Search
CPC combination set(s) only.
See application file for complete search history.

(56) References Cited

U.S. PATENT DOCUMENTS

| | | |
|---|---|---|
| 1,559,591 A | 11/1925 | Weaver et al. |
| 2,377,849 A | 6/1945 | Binkert et al. |
| | (Continued) | |

FOREIGN PATENT DOCUMENTS

| | | |
|---|---|---|
| EP | 1770031 A1 | 4/2007 |
| FR | 2902881 A1 | 12/2007 |
| WO | 0183387 A1 | 11/2001 |

OTHER PUBLICATIONS

Gyrotron Technology, Inc, Beam Properties Gyrotron (Year: 2017).*
(Continued)

*Primary Examiner* — Jodi C Franklin
(74) *Attorney, Agent, or Firm* — Neil J. Friedrich

(57) ABSTRACT

Methods and systems are provided for automated shaping of a glass sheet. The methods comprise preheating the glass, bending the glass through selective, and focused beam heating through the use of an ultra-high frequency, high-power electromagnetic wave, and computer implemented processes utilizing thermal and shape (positional) data obtained in real-time, and cooling the glass sheet to produce a glass sheet suitable for use in air and space vehicles.

8 Claims, 13 Drawing Sheets

Related U.S. Application Data continuation-in-part of application No. 13/905,365, filed on May 30, 2013, now Pat. No. 9,108,875.

(56) References Cited

U.S. PATENT DOCUMENTS

| | | |
|---|---|---|
| 2,620,932 A | 12/1952 | Alpine |
| 3,160,491 A | 12/1964 | Binkert et al. |
| 3,838,779 A | 10/1974 | Dawson |
| 3,881,618 A | 5/1975 | Tausheck |
| 3,896,954 A | 7/1975 | Dawson |
| 3,936,291 A | 2/1976 | McMaster |
| 4,004,901 A | 1/1977 | Starr |
| 4,043,785 A | 8/1977 | Reese |
| 4,065,284 A | 12/1977 | Mang et al. |
| 4,072,493 A | 2/1978 | Imler |
| 4,192,689 A | 3/1980 | Rinehart |
| 4,302,417 A | 11/1981 | Michelotti |
| 4,381,933 A | 5/1983 | Schultz et al. |
| 4,601,743 A | 7/1986 | Canfield |
| 4,604,934 A | 8/1986 | Elliott et al. |
| 4,626,267 A | 12/1986 | Reese et al. |
| 4,744,809 A | 5/1988 | Pecoraro et al. |
| 4,807,144 A | 2/1989 | Joehlin et al. |
| 4,820,902 A | 4/1989 | Gillery |
| 4,963,709 A * | 10/1990 | Kimrey, Jr. ............. C04B 35/64 219/686 |
| 4,976,762 A | 12/1990 | Anttonen |
| 5,028,759 A | 7/1991 | Finley |
| 5,120,570 A | 6/1992 | Boaz |
| 5,137,561 A | 8/1992 | Schnabel, Jr. |
| 5,232,482 A | 8/1993 | Laakso et al. |
| 5,306,324 A * | 4/1994 | Vehmas ............... C03B 23/0235 65/104 |
| 5,431,966 A | 7/1995 | Daude et al. |
| 5,437,704 A | 8/1995 | Yli-Vakkuri et al. |
| 5,565,388 A | 10/1996 | Krumwiede et al. |
| 5,647,882 A | 7/1997 | Thiessen |
| 5,656,053 A | 8/1997 | Boaz |
| 5,679,123 A | 10/1997 | Bennett et al. |
| 5,680,217 A | 10/1997 | Yli-Vakkuri |
| 5,782,947 A * | 7/1998 | Boaz ................... C03B 23/0235 219/678 |
| 5,820,650 A | 10/1998 | Yamazaki |
| 5,827,345 A * | 10/1998 | Boaz ................... C03B 23/0258 65/104 |
| 5,900,034 A | 5/1999 | Mumford et al. |
| 6,094,942 A | 8/2000 | Falleroni et al. |
| 6,112,903 A * | 9/2000 | Kimmel ................. G01N 22/00 198/461.2 |
| 6,168,064 B1 | 1/2001 | Berkin |
| 6,301,858 B1 | 10/2001 | Crandell |
| 6,357,262 B1 | 3/2002 | Friedel et al. |
| 6,368,994 B1 | 4/2002 | Sklyarevich |
| 6,408,649 B1 | 6/2002 | Sklyarevich et al. |
| 6,424,090 B1 | 7/2002 | Sklyarevich |
| 6,470,711 B1 | 10/2002 | Jarvinen et al. |
| 6,598,426 B2 | 7/2003 | Vandal et al. |
| 6,629,436 B1 | 10/2003 | Skeen et al. |
| 6,690,419 B1 * | 2/2004 | Silverbrook ............. G06T 7/73 348/239 |
| 6,718,798 B2 | 4/2004 | Nitschke et al. |
| 6,788,336 B1 * | 9/2004 | Silverbrook ......... B41J 2/17513 348/207.2 |
| 6,810,784 B1 | 11/2004 | Cunningham |
| 6,826,929 B2 | 12/2004 | Boaz |
| 7,140,204 B2 | 11/2006 | Vandal |
| 7,231,787 B2 | 6/2007 | Neuman et al. |
| 7,237,408 B2 | 7/2007 | Frank et al. |
| 7,240,519 B2 | 7/2007 | Schwartz et al. |
| 7,270,236 B2 | 9/2007 | Angeletti et al. |
| 7,344,613 B2 | 3/2008 | Sklyarevich et al. |
| 7,459,199 B2 * | 12/2008 | Skeen ............... B32B 17/10036 428/192 |
| 7,585,801 B2 | 9/2009 | Shelestak |
| 8,062,749 B2 | 11/2011 | Shelestak et al. |
| 8,087,133 B2 | 1/2012 | Jerger et al. |
| 8,155,816 B2 | 4/2012 | Rashid et al. |
| 8,234,883 B2 | 8/2012 | Krall, Jr. et al. |
| 8,978,420 B2 | 3/2015 | DeAngelis et al. |
| 9,259,864 B2 | 2/2016 | Herkner |
| 2002/0148255 A1 | 10/2002 | Vandal et al. |
| 2002/0197423 A1 | 12/2002 | Wang et al. |
| 2003/0019244 A1 | 1/2003 | Thomas et al. |
| 2003/0037570 A1 * | 2/2003 | Sklyarevich .......... C03B 29/025 65/102 |
| 2003/0106340 A1 | 6/2003 | Nitschke et al. |
| 2003/0162466 A1 | 8/2003 | King |
| 2003/0183612 A1 * | 10/2003 | Timans ................. C30B 31/12 219/390 |
| 2004/0000168 A1 | 1/2004 | Vandal |
| 2004/0025539 A1 | 2/2004 | Fischer et al. |
| 2004/0075747 A1 * | 4/2004 | Silverbrook ......... B41J 2/14314 348/207.99 |
| 2004/0093904 A1 | 5/2004 | Haws et al. |
| 2004/0174540 A1 | 9/2004 | Saito |
| 2004/0240972 A1 | 12/2004 | Mori et al. |
| 2005/0217319 A1 | 10/2005 | Yoshizawa |
| 2005/0221017 A1 | 10/2005 | Sklyarevich et al. |
| 2005/0226287 A1 * | 10/2005 | Shah .................... H01S 3/0057 372/25 |
| 2006/0026994 A1 | 2/2006 | Yoshizawa |
| 2006/0185395 A1 * | 8/2006 | Sklyarevich ......... C03B 23/0258 65/60.5 |
| 2007/0000285 A1 | 1/2007 | Vandal |
| 2007/0010403 A1 * | 1/2007 | Nanno ............... G05D 23/1917 505/430 |
| 2007/0017253 A1 | 1/2007 | Janhunen |
| 2007/0045298 A1 | 3/2007 | Sklyarevich et al. |
| 2007/0051233 A1 * | 3/2007 | Duge ..................... F41H 13/00 89/1.13 |
| 2007/0140311 A1 | 6/2007 | House et al. |
| 2008/0060744 A1 | 3/2008 | Sklyarevich et al. |
| 2008/0068620 A1 | 3/2008 | Janhunen |
| 2009/0078370 A1 | 3/2009 | Sklyarevich et al. |
| 2009/0244472 A1 | 10/2009 | Dunn |
| 2009/0320524 A1 | 12/2009 | Abramov et al. |
| 2010/0214406 A1 | 8/2010 | Potapenko |
| 2010/0246923 A1 | 9/2010 | Nathaniel et al. |
| 2011/0100060 A1 | 5/2011 | Tetlow |
| 2011/0162411 A1 | 7/2011 | Kuhn et al. |
| 2011/0189056 A1 * | 8/2011 | Brownell ............... B01J 19/126 422/186 |
| 2011/0265515 A1 | 11/2011 | Hernandez Delsol et al. |
| 2012/0118541 A1 | 5/2012 | Von Der Waydbrink et al. |
| 2012/0131961 A1 * | 5/2012 | Dannoux ............ C03B 23/0258 65/103 |
| 2012/0297828 A1 * | 11/2012 | Bailey ..................... F28F 9/026 65/29.18 |
| 2012/0304695 A1 | 12/2012 | Lakota et al. |
| 2013/0015180 A1 * | 1/2013 | Godard ................. C03B 23/023 219/759 |
| 2013/0019639 A1 | 1/2013 | Saito et al. |
| 2013/0136565 A1 | 5/2013 | Amsden et al. |
| 2013/0329346 A1 | 12/2013 | Dannoux et al. |
| 2014/0165653 A1 * | 6/2014 | DeAngelis .......... C03B 23/0066 65/29.14 |
| 2014/0234576 A1 | 8/2014 | Berard et al. |
| 2014/0234581 A1 * | 8/2014 | Immerman ......... C03B 23/0235 428/141 |
| 2014/0311573 A1 * | 10/2014 | McCamy ............... C23C 16/545 136/261 |
| 2014/0352357 A1 | 12/2014 | Jiao et al. |
| 2015/0258750 A1 | 9/2015 | Kang et al. |
| 2015/0321940 A1 * | 11/2015 | Dannoux ............ C03B 23/0256 65/106 |
| 2015/0344346 A1 * | 12/2015 | Jiao ....................... C03B 35/187 65/29.11 |
| 2016/0031736 A1 * | 2/2016 | Muehlke ............... C03B 23/023 428/172 |

(56) References Cited

U.S. PATENT DOCUMENTS

2016/0145139 A1* 5/2016 Fredholm ............... C03B 25/08
                                                                                            65/29.1
2016/0257598 A1 9/2016 Vild et al.

OTHER PUBLICATIONS

Gyrotron Technology, Inc, Microwave melting of glass (Year: 2017).*
Lian Sawires is vice president at Gyrotron Technology Inc., Catch the microwave (Year: 2004).*
PCT Search Report, PCT/US2014/038918, dated Aug. 19, 2014.

* cited by examiner

MICROWAVE HEATING GLASS BENDING PROCESS

CROSS REFERENCE TO RELATED APPLICATIONS

This application is a continuation of U.S. patent application Ser. No. 14/819,849 filed on Aug. 6, 2015, which is a continuation-in-part of U.S. patent application Ser. No. 13/905,365, filed on May 30, 2013 (now U.S. Pat. No. 9,108,875, issued on Aug. 18, 2015), the entirety of which is incorporated herein by reference.

BACKGROUND OF THE INVENTION

Field of the Invention

This invention relates to a heating and bending (and/or shaping) system using microwave focused beam heating, and more particularly, to a glass line having at least two, for example, at least three, heating furnaces. Wherein the first heating furnace is used to preheat one or more glass substrates to a first temperature; the second heating furnace, being a glass forming furnace, maintains the substrates at the first temperature and heats and bends selected portions of the one or more glass substrates using microwave focused beam heating, and the first heating furnace, or a third furnace, controllably cools the one or more glass substrates.

Also provided herein are methods for real-time monitoring of the temperature and bending of a glass sheet to be shaped.

Description of the Related Art

Bending devices, commonly referred to in the bending art as bending irons or shaping irons, are well known in the art for shaping one or more glass sheets for use in the manufacture of monolithic and laminated transparencies for land, water, air and space vehicles. The method for shaping the glass substrates or sheets for use in the manufacture of transparencies for land and water vehicles usually includes providing one or more glass sheets having seamed or smoothed edges and a predetermined size; moving the glass sheets supported on a bending iron through a furnace to heat soften the glass sheets; shaping the glass sheets; controllably cooling the shaped glass sheets to anneal or thermally temper the shaped glass sheets, and using the shaped glass sheets in the manufacture of a transparency for a land or water vehicle. The method for shaping glass substrates or sheets for use in the manufacture of transparencies for air and space vehicles usually includes providing one or more glass sheets having seamed or smoothed edges and a predetermined size; moving the glass sheets supported on a bending iron through a furnace to heat soften the glass sheets; shaping the glass sheets; controllably cooling the shaped glass sheets to anneal the shaped glass sheets; cutting the shaped glass sheets to a second predetermined size; seaming or smoothing the edges of the shaped glass sheets; chemically tempering the shaped glass sheets, or thermally tempering the shaped glass sheets, and using the tempered shaped glass sheets in the manufacture of a transparency for an air or space vehicle.

The difference of interest in the present discussion between shaping glass sheets for use with transparencies for land and water vehicles and shaping glass sheets for use with transparencies for air and space vehicles is that the glass sheets for use with transparencies for land and water vehicles are cut to size before shaping or bending, whereas glass sheets for use with transparencies for air and space vehicles are cut to an over size before shaping and then cut to size after bending. For purposes of clarity, the process presently available for shaping glass sheets for use with transparencies for land and water vehicles is also referred to as "cut-to-size process", and the process presently available for shaping a glass sheet for use with transparencies in air and space vehicles is referred to as "cut-after-bend process".

The cut-to-size process allows cutting of the glass sheet to the exact size desired prior to the heating and bending of the glass sheet. However, the cut-to-size process does not account for any possible marring that may occur on the surface of the glass sheet, which can make the optical quality of the glass sheet and subsequently formed transparency unacceptable.

One solution to this problem is to provide a bending iron that has improvements in its design to prevent the marring of the surface of the glass sheet in contact with the bending iron. Such a bending iron is disclosed in U.S. Ser. No. 13/714,494. Another solution to this problem is to reduce the temperature of the furnace and/or the time period of the heating cycle for shaping the glass sheets to reduce or eliminate marring of the surface of the glass sheet in contact with the bending iron during the sheet shaping process.

As can now be appreciated by those skilled in the art, it would be advantageous to provide a process of, and/or equipment for, shaping glass sheets for use in aircraft and space transparencies using the cut-to-size process, while eliminating or reducing marring of the surface of the glass sheet in contact with the bending iron.

It would also be advantageous, to eliminate the process of "cut-after-bend" by providing a system and method that allow for the efficient and effective heating, and/or shaping into complex shapes, and/or cooling of a sheet of glass.

SUMMARY OF THE INVENTION

Provided herein are methods and systems for producing complex glass sheet shapes in an efficient, and automated manner. The methods and systems provided herein are an improvement over previous technologies in that they allow for precise, tailor-made shapes, without the use of excessive heat and the resulting increase in the likelihood of marring. Further, by real-time feedback, the methods and systems described herein ensure that the complex shapes are achieved every time.

Provided herein are methods and systems for shaping, and/or, bending a glass sheet comprising: preheating a glass sheet on a bending iron to a preheating temperature ranging from 600° F. to 1000° F.; increasing the temperature of the sheet to a temperature ranging from greater than the preheating temperature to less than a temperature at which the glass sags, for example in a temperature range of, but not limited to, 1100° F. to 1250° F. Bending the glass sheet by: i.) selectively heating a portion of the glass sheet with a gyrotron beam controlled by a computer-implemented protocol to a temperature at which at least a portion of the glass sheet sags; ii.) scanning at least a portion of the glass sheet with one or more infrared (IR) scanners at one or more time points during or after the selective heating step and obtaining from data obtained from the one or more IR scanners a temperature distribution in at least two dimensions for at least a portion of the glass sheet; iii.) comparing, using a computer-implemented process, the obtained temperature distribution to a reference temperature distribution of the computer-implemented protocol; and selectively heating the glass sheet with the gyrotron beam controlled by a computer-implemented process to match the obtained temperature distribution with the reference temperature distribution of the computer-implemented protocol.

Additionally provided herein is a system comprising: a first furnace, also herein referred to as the glass preheating chamber/oven, comprising infrared heaters and temperature sensors; a second furnace, also herein referred to as the glass shaping, glass bending, and/or glass forming furnace, comprising infrared heaters, a gyrotron system comprising a gyrotron device, or other device that can produce ultra-high frequency, e.g., at least 20 GHz (gigahertz), for example ranging from 20 GHz to 300 GHz, and high-power, e.g., at least 5 kW (kilowatt) electromagnetic waves within the microwave spectrum, and an optical system for controlling shape, location and movement of a beam of the gyrotron device to a glass sheet on a bending iron within the second furnace, and one or more infrared (IR) imaging sensors; a conveyor system for carrying a glass sheet on a bending iron through the first and second furnaces; a computer system connected to the one or more IR imaging sensors and the gyrotron system, comprising a processor and instructions for controlling bending of a glass sheet in the second furnace by selective heating by the gyrotron system, the instructions comprising a computer-implemented protocol for heating and bending a glass sheet in the second furnace, where the computer system obtains a temperature profile of the glass sheet at one or more time points during the bending of the glass data from the one or more IR imaging sensors, compares the obtained temperature profile to a reference temperature distribution of the computer-implemented protocol, and controls the gyrotron beam system to selectively heat the glass sheet to match the reference temperature distribution. The system optionally contains a third heating furnace to controllably cool the glass sheet. The third furnace comprising IR heaters, a forced cool air convection system, and air fans. If a third furnace is not present, then the first furnace will contain all of these features.

In addition, this invention relates to a method of operating a furnace system to shape a glass sheet for, e.g., an aircraft transparency, the method includes, among other things:

a) placing a flat glass sheet on a bending iron having a fixed shaping rail and a shaping rail on an articulating arm defined as a moveable shaping rail;

b) positioning the bending iron having the glass sheet in an interior of a furnace to heat the glass sheet to shape the glass sheet on the fixed shaping rail while moving a beam of microwave energy from a gyrotron to heat portions of the glass sheet overlaying the moveable shaping rail to shape the portions of the glass sheet by movement of the articulating arm;

c) obtaining and transmitting to a computer one or more thermal images of at least a portion of the glass sheet from one or more IR imaging sensors, and optionally one or more shape profile images from one or more 3D imaging sensors;

d) analyzing using a computer-implemented method the one or more thermal images and optionally the one or more shape profile images, and comparing the images with a computer-implemented method to one or more reference thermal images, and optionally one or more reference shape profile images, to determine a difference between the one or more thermal and, optionally, shape profile images and the reference images;

e) based on a predetermined heat (power and speed) profile as reference, directing, using a computer-implemented method, a beam of microwave energy from the gyrotron, or other suitable source, to heat portions of the glass sheet to match the one or more reference thermal images, and optionally to match the one or more reference shape profile images, repeating the analyzing and comparing steps until the one or more thermal images match the one or more reference thermal images, and optionally until the one or more shape profile images matches the one or more reference shape profile images;

f) through the computer-implemented methods, producing a glass viscosity distribution, allowing the glass sheet to be formed or bent into a required shape with acceptable optical quality; and g) controllably cooling the shaped glass sheet.

DETAILED DESCRIPTION

Figure 1:
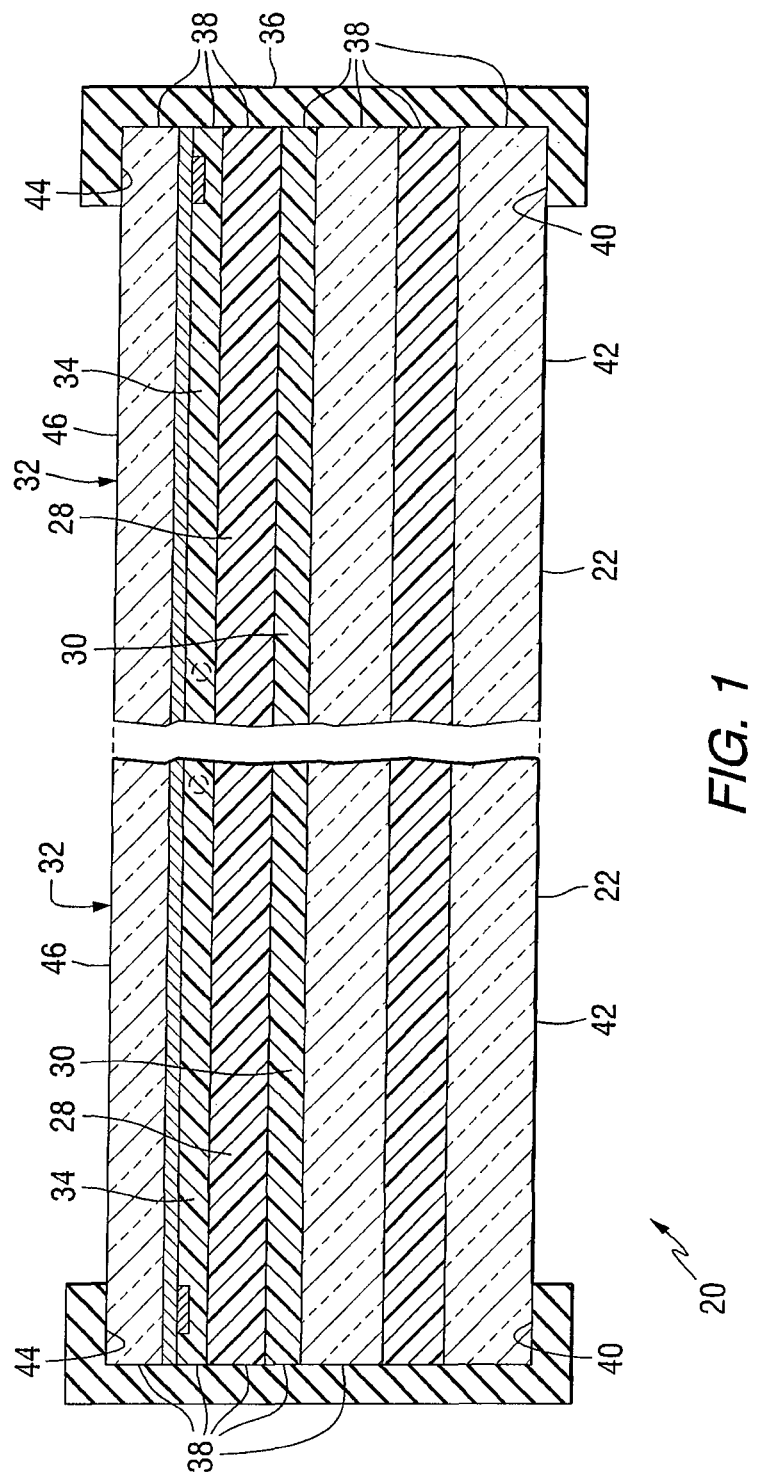
FIG. 1 is a cross sectional view of a laminated aircraft transparency illustrating the laminated structure of the transparency.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For ranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the term, "over" means on but not necessarily in contact with the surface. For example, a first substrate "over" a second substrate does not preclude the presence of one or more other substrates of the same or different composition located between the first and the second substrates.

Before discussing the invention, it is understood that the invention is not limited in its application to the specific illustrated examples as these are merely illustrative of the general inventive concept. Further, the terminology used herein to discuss the invention is for the purpose of description and is not of limitation. Still further, unless indicated otherwise in the following discussion, like numbers refer to like elements.

For purposes of the following discussion, the invention will be discussed with reference to shaping a sheet for an aircraft transparency. With regard to the instant application, the term "glass shaping" refers to the concept of glass bending and/or glass forming. These terms are used interchangeably throughout the instant application. As will be appreciated, the invention is not limited to the material of the sheet, e.g. the sheet can be, but is not limited to, a glass sheet or a plastic sheet. In the broad practice of the invention, the sheet can be made of any desired material having any desired characteristics. For example, the sheet can be opaque, transparent or translucent to visible light. By "opaque" is meant having visible light transmission of 0%. By "transparent" is meant having visible light transmission in the range of greater than 0% to 100%. By "translucent" is meant allowing electromagnetic energy (e.g., visible light) to pass through but diffusing this energy such that objects on the side opposite the viewer are not clearly visible. In the preferred practice of the invention, the sheet is a transparent glass sheet. The glass sheet can include conventional soda-lime-silica glass, borosilicate glass, or lithia-alumina-silica glass. The glass can be clear glass. By "clear glass" is meant non-tinted or non-colored glass. Alternatively, the glass can be tinted or otherwise colored glass. The glass can be annealed, heat-treated or chemically tempered. In the practice of the invention, the glass can be conventional float glass, and can be of any composition having any optical properties, e.g., any value of visible transmission, ultraviolet transmission, infrared transmission, and/or total solar energy transmission. By "float glass" is meant glass formed by a conventional float process. Examples of float glass processes are disclosed in U.S. Pat. Nos. 4,744,809 and 6,094,942, which patents are hereby incorporated by reference.

In one example of the invention, the glass was a clear lithia-alumina-silica glass of the type disclosed in U.S. Pat. No. 8,062,749, and in another example of the invention the glass was a clear soda-lime-silica glass of the type disclosed in U.S. Pat. Nos. 4,192,689; 5,565,388, and 7,585,801.

The glass sheet can be used in the manufacture of shaped monolithic or shaped laminated transparencies for an aircraft. However as can be appreciated, the shaped glass sheets of the invention can be used in the manufacture of any type of transparency, such as but not limited to, windshields, windows, rear lights, sunroofs and moon roofs; laminated or non-laminated residential and/or commercial windows; insulating glass units, and/or transparencies for land, air, space, above water and under water vehicles. Non-limiting examples of vehicle transparencies, residential and commercial transparencies, and aircraft transparencies and methods of making the same are found in U.S. Pat. Nos. 4,820,902; 5,028,759, 6,301,858 and 8,155,816, which patents are hereby incorporated herein by reference.

Shown in FIG. 1 is a cross-sectional view of an exemplary laminated aircraft windshield 20 that has components that can be made by the practice of the invention. The windshield 20 includes a first glass sheet 22 secured to a vinyl-interlayer or sheet 28 by a first urethane interlayer 30, and the vinyl-interlayer 28 is secured to a heatable member 32 by a second urethane interlayer 34. An edge member or moisture barrier 36 of the type used in the art, e.g., but not limited to, a silicone rubber or other flexible durable moisture resistant material, is secured to (1) a peripheral edge 38 of the windshield 20, i.e., the peripheral edge 38 of the vinyl-interlayer 28; of the first and second urethane interlayers 30, 34 and of the heatable member 32; (2) margins or marginal edges 40 of an outer surface 42 of the windshield 20, i.e., the margins 40 of the outer surface 42 of the first glass sheet 22 of the windshield 20, and (3) margins or marginal edges 44 of an outer surface 46 of the windshield 20, i.e. margins of the outer surface 46 of the heatable member 32.

The first glass sheet 22, the vinyl-interlayer 28, and the first urethane interlayer 30 form the structural part, or inner segment, of the windshield 20. The outer surface 42 of the windshield 20 faces the interior of the vehicle, e.g. an aircraft (not shown). The urethane layer 34 and the heatable member 32 form the non-structural part, or outer segment, of the windshield 20. The surface 46 of the windshield 20 faces the exterior of the aircraft. The heatable member 32 provides heat to remove fog from, and/or to melt ice on, the outer surface 46 of the windshield 20.

Figure 2:
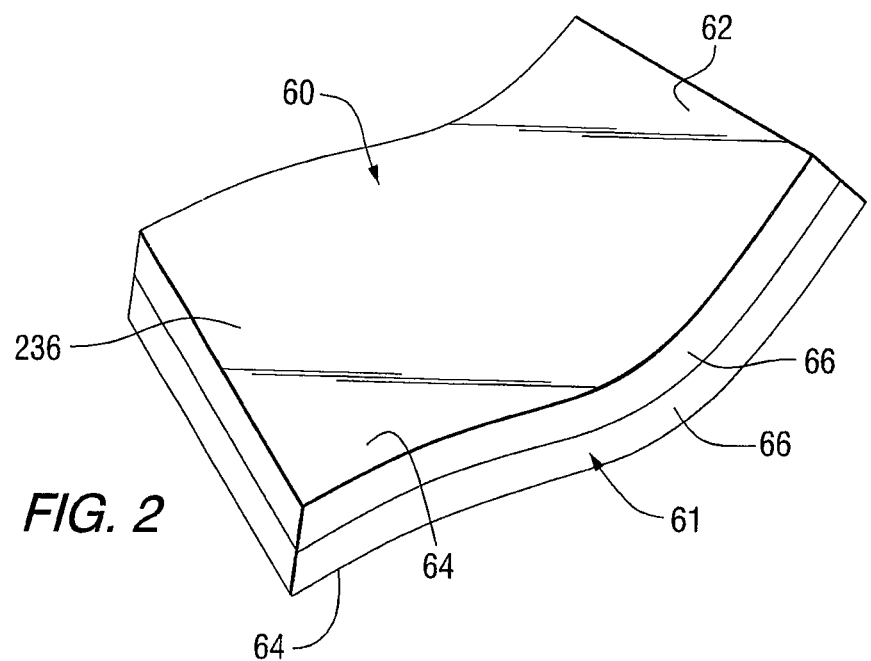
FIG. 2 is a perspective view of shaped sheets that are shaped in accordance to the teachings of the invention.
Figure 3:
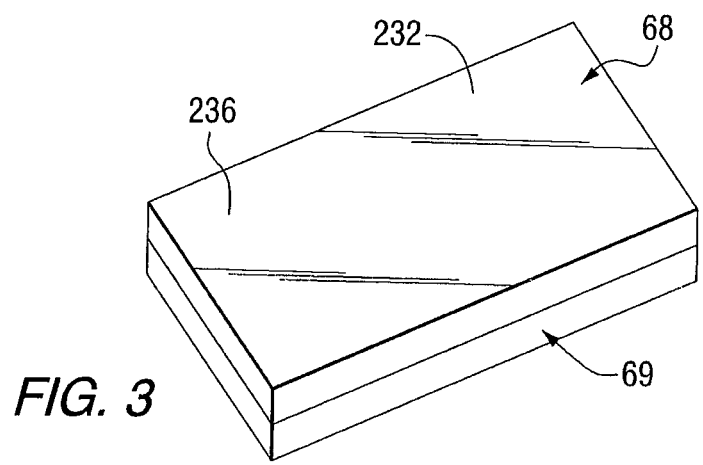
FIG. 3 is a perspective view of flat sheets that can be shaped in accordance to the teachings of the invention to, among other things, provide the shaped sheets of FIG. 2.
Figure 4:
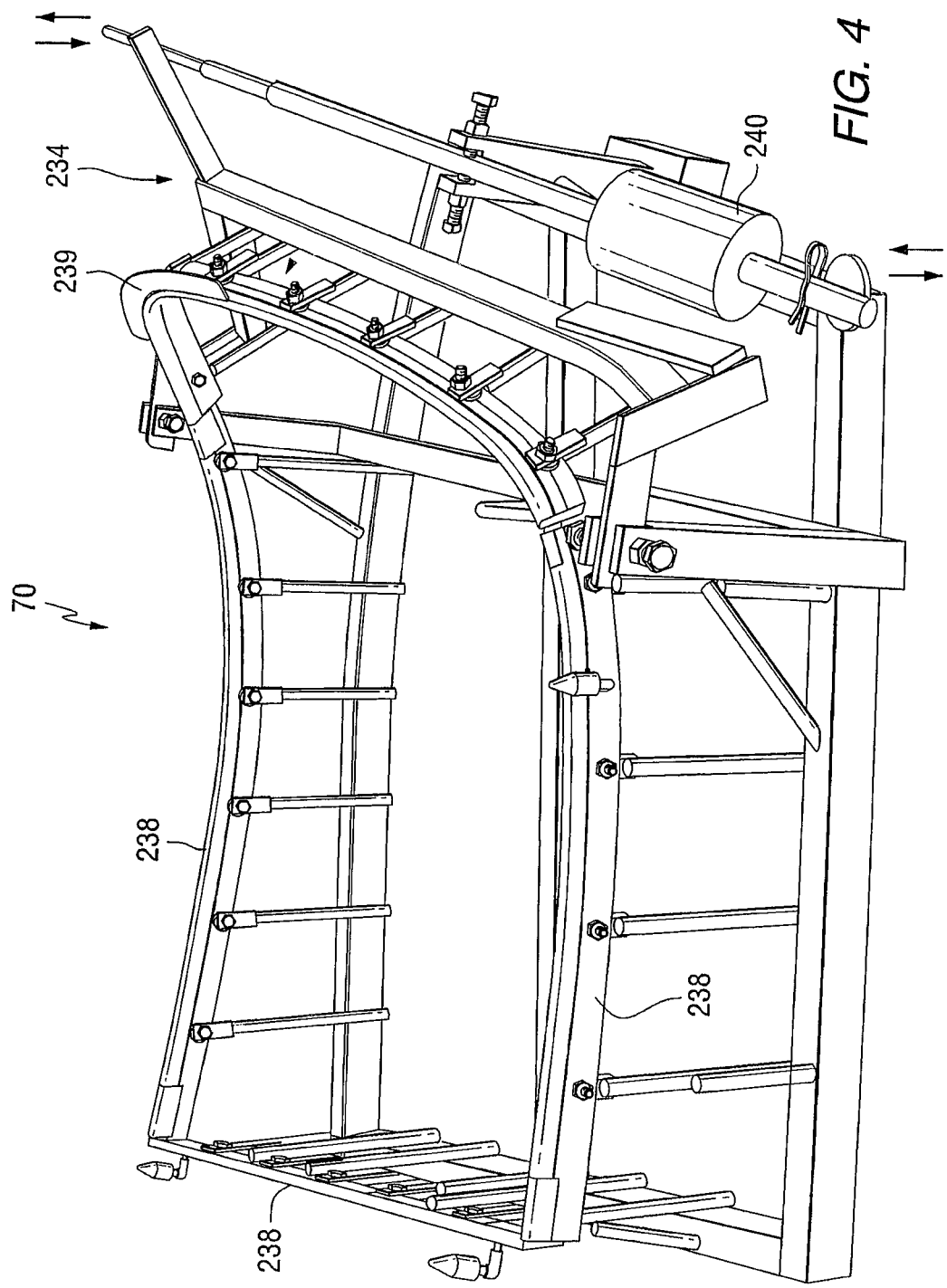
FIG. 4 is perspective view of a non-limiting embodiment of a bending device that can be used in the practice of the invention to, among other things, shape glass sheets, e.g., but not limited to, the sheets of FIG. 3, to the shaped sheets shown in FIG. 2.

Shown in FIG. 2, are two pieces of shaped glass sheets 60 and 61 shaped in accordance to the teachings of the invention. Each of the glass sheets 60 and 61 have curved end portions 62 and 64, and a shaped intermediate portion 66. For example, the shaped glass sheets 60 and 61 can be shaped from flat glass sheets 68 and 69 shown in FIG. 3 using the bending iron 70 shown in FIG. 4. The bending irons disclosed in U.S. patent application Ser. No. 13/714, 494, entitled Bending Device For Shaping Glass For Use In Aircraft Transparencies filed on Dec. 14, 2012 can be used in the practice of the invention. The disclosure of U.S. patent application Ser. No. 13/714,494 (hereinafter also referred to as "USPA '494") in its entirety is incorporated herein by reference. For a detailed discussion of the bending iron 70, attention is directed to USPA '494. FIG. 4 of this document corresponds to FIG. 4 of USPA '494. As can be appreciated, the invention is not limited to the bending iron 70 and any design of a bending iron can be used in the practice of the invention to shape one sheet or simultaneously shape two sheets 68 and 69 (see FIG. 3), or shape more than two sheets to any desired shape.

Figure 5:
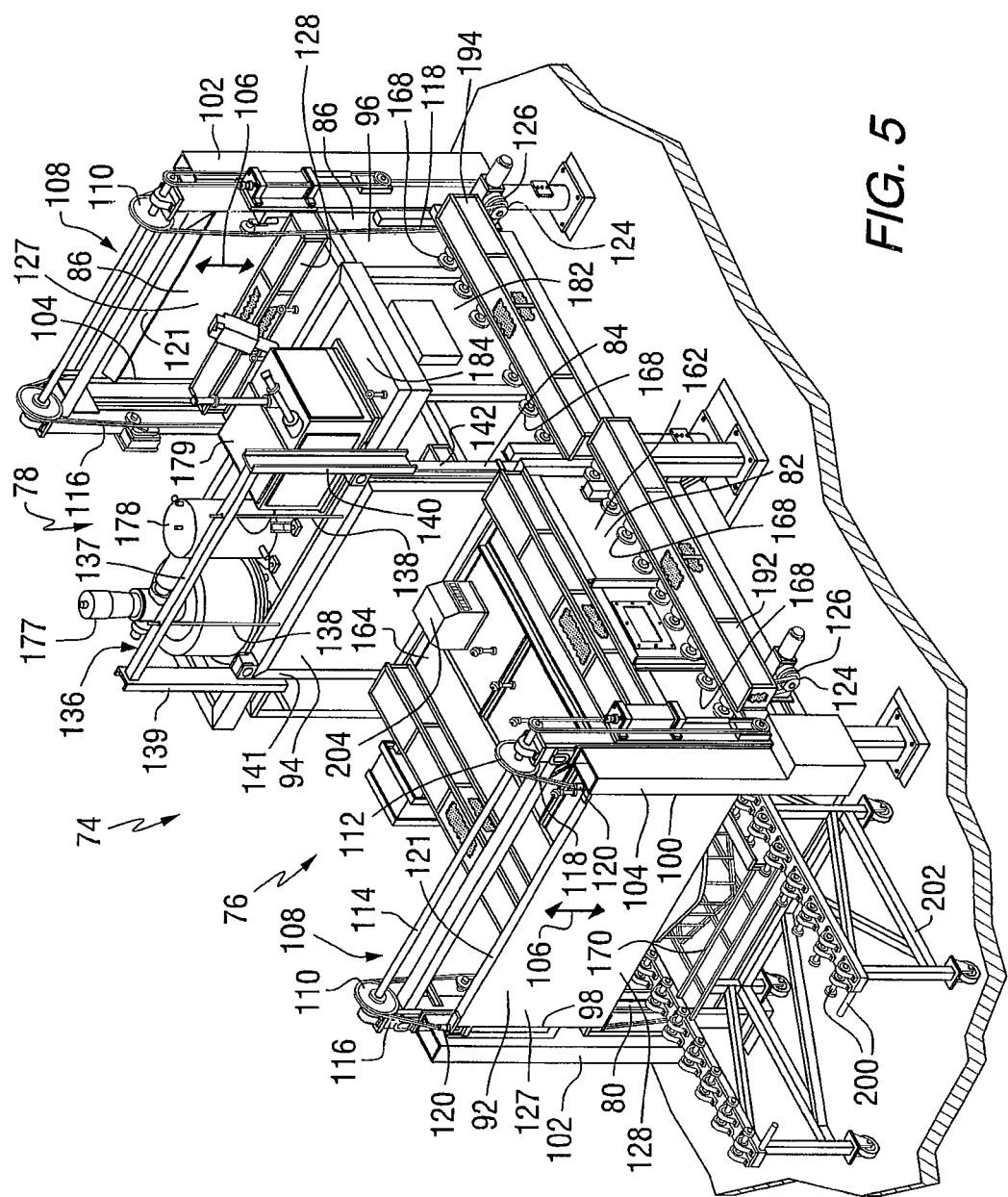
FIG. 5 is perspective view of a non-limiting embodiment of a furnace system that can be used in the practice of the invention to, among other things, heat and shape glass sheets, e.g., but not limited to, heating and shaping the sheets of FIG. 3 to the shaped sheets shown in FIG. 2 in accordance to the teachings of the invention.
Figure 6:
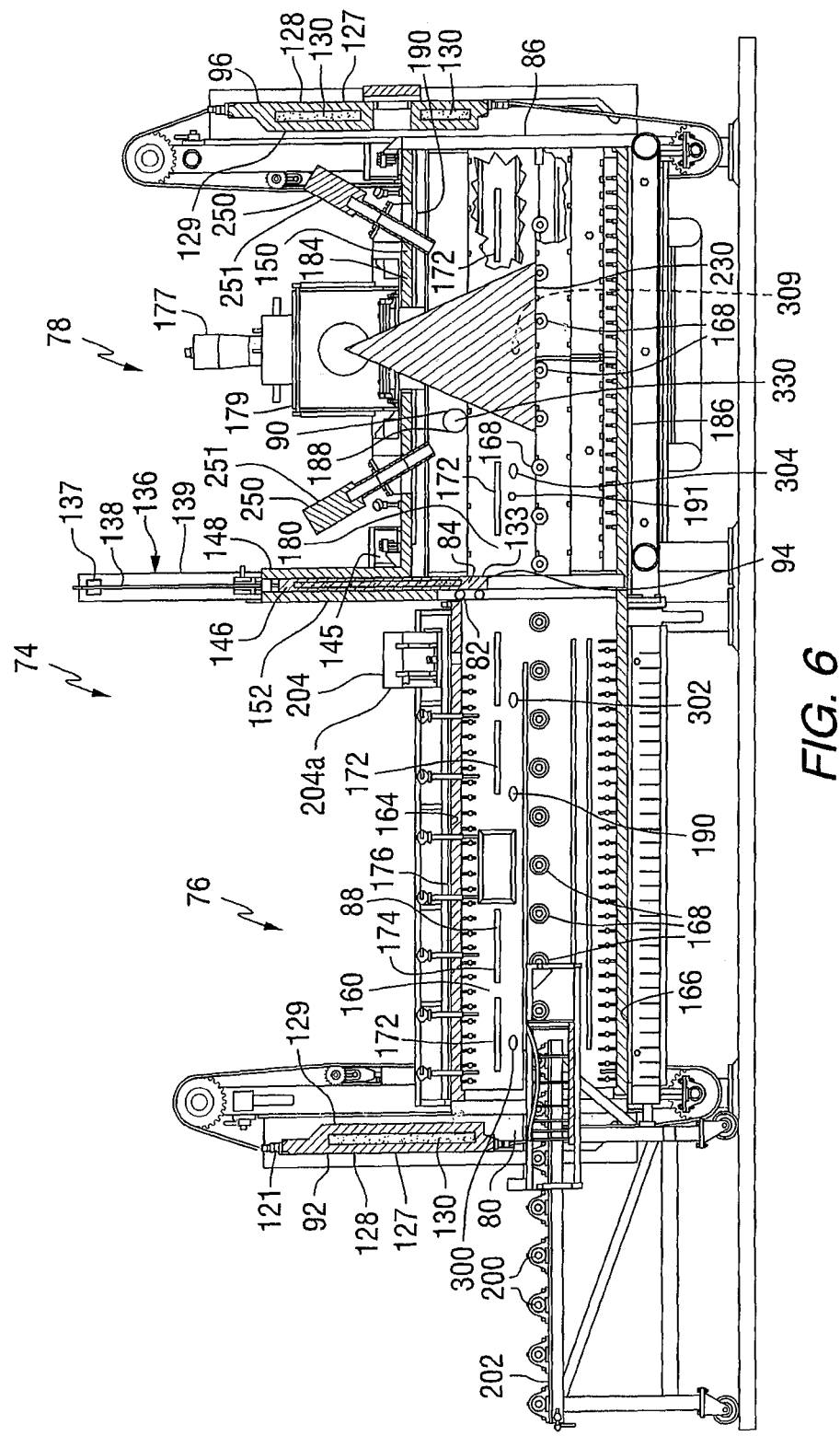
FIG. 6 is an elevated cross sectional view of the furnace shown in FIG. 5.

FIGS. 5 and 6 show an exemplary furnace 74, e.g., but not limited to, a furnace system, or apparatus of the invention for heating and shaping glass sheets, e.g., but not limited to, the shaped glass sheets 68 and 69. The furnace 74 includes a first chamber 76 or furnace and a second chamber 78 or furnace. The first chamber 76 preheats a glass sheet, e.g. but not limited to the flat glass sheet 68 or flat glass sheets 68 and 69 (see FIG. 3), supported or positioned on the bending iron 70 (FIG. 4), and controllably cools the shaped glass sheet, e.g. but not limited to the shaped glass sheet 60 or shaped glass sheets 60 and 61 (FIG. 2), supported or positioned on the bending iron 70 to anneal the shaped glass sheets. The second chamber 78 selectively heats portions of the flat glass sheets 68 and 69 in accordance to the teachings of the invention to shape the glass sheets 68 and 69 to a desired shape, e.g., but not limiting to the invention, to the shape of the shaped glass sheets 60 and 61 shown in FIG. 2.

The first chamber 76 has a first opening 80 (also referred to as the "entrance 80" of the first chamber 76) and a second opening 82 (also referred to as the "exit 82" of the first chamber 76) opposite to and spaced from the first opening 80 (second opening clearly shown in FIG. 6). The second chamber 78 has a first opening 84 (also referred to as the "entrance 84" of the second chamber 78) and a second opening 86 (also referred to as the "exit 86" of the second chamber 78) opposite to and spaced from the first opening 84 of the second chamber 78. With this arrangement, the flat sheets 68 and 69 supported on the bending iron 70 are moved through the first opening 80 of the first chamber 76 into an interior 88 (see FIG. 6) of the first chamber 76 to preheat the glass sheets 68 and 69. The preheated glass sheets 68 and 69 are moved through the second opening 82 of the first chamber 76 and through the first opening 84 of the second chamber 78 into an interior 90 (see FIG. 6) of the second chamber 78 to controllably heat the glass sheets 68 and 69 to shape the glass sheets in accordance to the teachings of the invention. The heated shaped glass sheets 60 and 61 are moved from the interior 90 of the second chamber 78 through the first opening 84 of the second chamber 78 and the second opening 82 of the first chamber 76 into the interior 88 of the first chamber 76 to controllably cool the shaped glass sheets. Thereafter, the shaped glass sheets 60 and 61 are moved from the interior 88 of the first chamber 76 through the first opening 80 of the first chamber 76.

The interior 88 of the first chamber 76 and the interior 90 of the second chamber 78 are separated from one another and from the environment exterior of the furnace 74 by providing a door 92 at the entrance 80 of the first chamber 76, a door 94 at the entrance 84 of the second chamber 78, and a door 96 at the exit 86 of the second chamber 78. As can be appreciated, the invention is not limited to the type of doors 92, 94, 96 provided at the entrance 80, entrance 84, and exit 86, respectively, and any door design and/or construction can be used in the practice of the invention. For example, the doors 92 and 96 can be similar in design and construction. In view of the forgoing, the discussion is now directed to the design and construction of the door 92 with the understanding that the discussion, unless indicated otherwise, is directed to the door 96. With reference to FIG. 5, the door 92 has sides 98 and 100 mounted in tracks 102 and 104 for reciprocal vertical movement to move upwardly to open the entrance 80, and to move downwardly to close the entrance 80, of the chamber 76, and for the door 96 to move upwardly to open the opening 86, and to move downwardly to close the opening 86. The opening 86 of the furnace 78 is used for, among other things, making repairs to, and performing maintenance on, the furnace 78; cleaning out the interior 90 of the furnace 78, e.g. but not limited to removing broken glass, and for expansion of the furnace 74 discussed in detail below.

The doors 92 and 96 are moved along the reciprocating vertical path designated by double headed arrow 106 by a pulley arrangement 108 including a pair wheels 110 and 112 spaced from one another and mounted on a rotating shaft 114. Cables 116, 118 have one end 120 secured to top side 121 adjacent to the sides 98, 100 of the doors 92 and 96, respectively (clearly shown for door 92) and opposite ends 124 of the cables 116, 118 each connected to an air cylinder 126 (clearly shown for doors 92 and 96 in FIG. 5).

For example, the doors 92 and 94 can be each made of an outer metal housing 127 having one side 128 made of steel, and the opposite side 129 facing the interior of its respective one of the furnaces made of stainless steel. The interior of the housing 127 can be filled with Kaowool insulation 130 (clearly shown in FIG. 6).

The shaped glass sheets 60 and 61 are moved into the first furnace and annealed. The method of annealing glass sheets is well known in the art, e.g. see U.S. Pat. No. 7,240,519, which patent in its entirety is hereby incorporated by reference, and no further discussion is deemed necessary. After the sheets are annealed, the door 92 is lifted and the shaped glass sheets are removed from the first furnace 76. The temperature differential between the first furnace 76 and the second furnace 78 when the shaped glass sheets 60 and 61 are removed from the first furnace 76 can reach temperatures in the range of 800-1000° F. More particularly, the temperature of the first furnace 76 can be as low as 200° F., the temperature the annealed shaped glass sheets 60 and 61 are removed on the moveable conveyor 202 from the first furnace 76, whereas the temperature of the second furnace 78 can be greater than 1000° F., the glass preheat temperature. To reduce heat loss between the first and the second furnaces 76 and 78, respectively, the door 94 can have a thermal conductivity of less than 0.80 BTU/(hr·ft·° F.).

Figure 7:
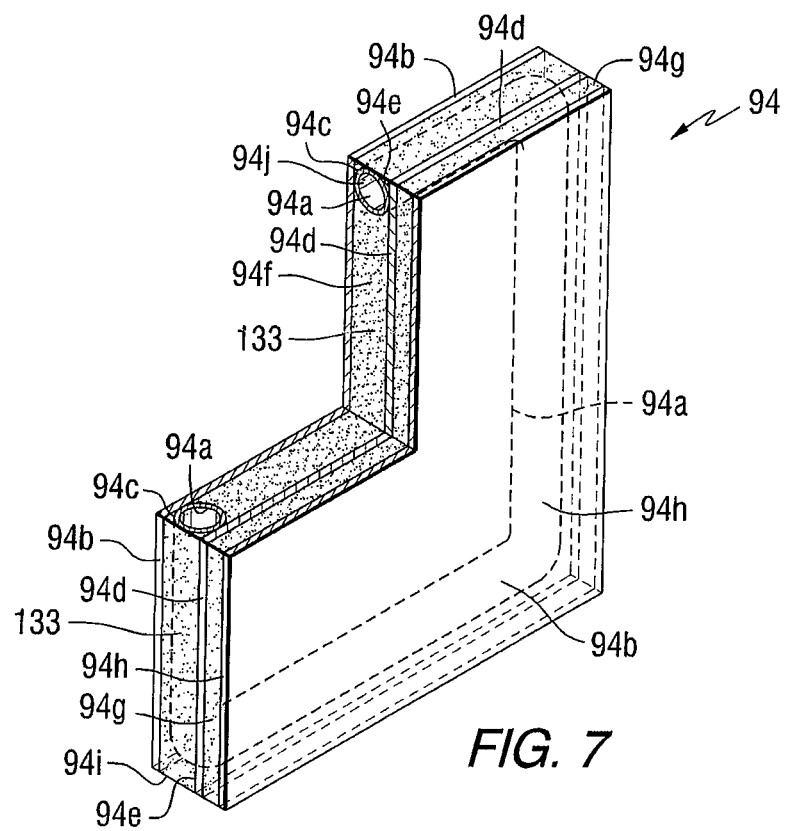
FIG. 7 is a perspective view of a furnace door having portions removed for purposes of clarity incorporating features of the invention to reduce heat loss between adjacent interiors of the furnace system shown in FIGS. 5 and 6.

With reference to FIG. 7, the exemplary door 94 includes a pipe frame 94a having a stainless steel 11 gage sheet 94b secured to side 94c of the pipe frame 94a and a stainless steel 11 gage sheet 94d secured to side 94e of the pipe frame 94a. A layer 133 of insulating material sold under the registered trademark Super Firetemp® M having a thickness of 1½ inches was provided within the pipe frame 94a between the stainless steel sheets 94b and 94d. A layer 94g of insulating material is provided over the steel sheet 94d and covered with 0.008-0.010 inch thick stainless steel foil 94h. The door 94 is mounted with the stainless steel sheet 94h facing the interior of the furnace 78. Opening 94i and 94j are connected to a compressor (not shown) to move room temperature compressed air through the pipe from 94a to cool the door 94 to prevent warping of the pipe frame 94a and sheets 94b and 94d. Optionally, the peripheral edge of the layers 94g is covered by the foil 94h.

The door 94 is connected to a vertically reciprocating inverted U shaped member 136 (clearly shown in FIG. 5). More particularly, the door 94 is connected to a middle leg 137 of the U-shaped member 136 by rods 138, and outer legs 139 and 140 are mounted for reciprocal vertical movement in vertical tracks 141 and 142, respectively (see FIG. 5) in any convenient manner. The U-shaped member is moved vertically upwardly and downwardly by an electric motor 145 (shown only in FIG. 6). With the door 94 in the down position, the entrance 84 of the furnace 78 is closed, and with the door 94 in the up position, the entrance 84 of the furnace 78 is open. In the up position, as shown in FIG. 6, the door 94 is moved into an envelope 146 formed on one side by a vertical extension 148 of a metal roof 150 of the furnace 78 (see FIG. 6) and another side 152 of the envelope 146 is made of a ceramic or metal wall secured between the tracks 140 and 142 (see FIG. 5).

Figure 8:
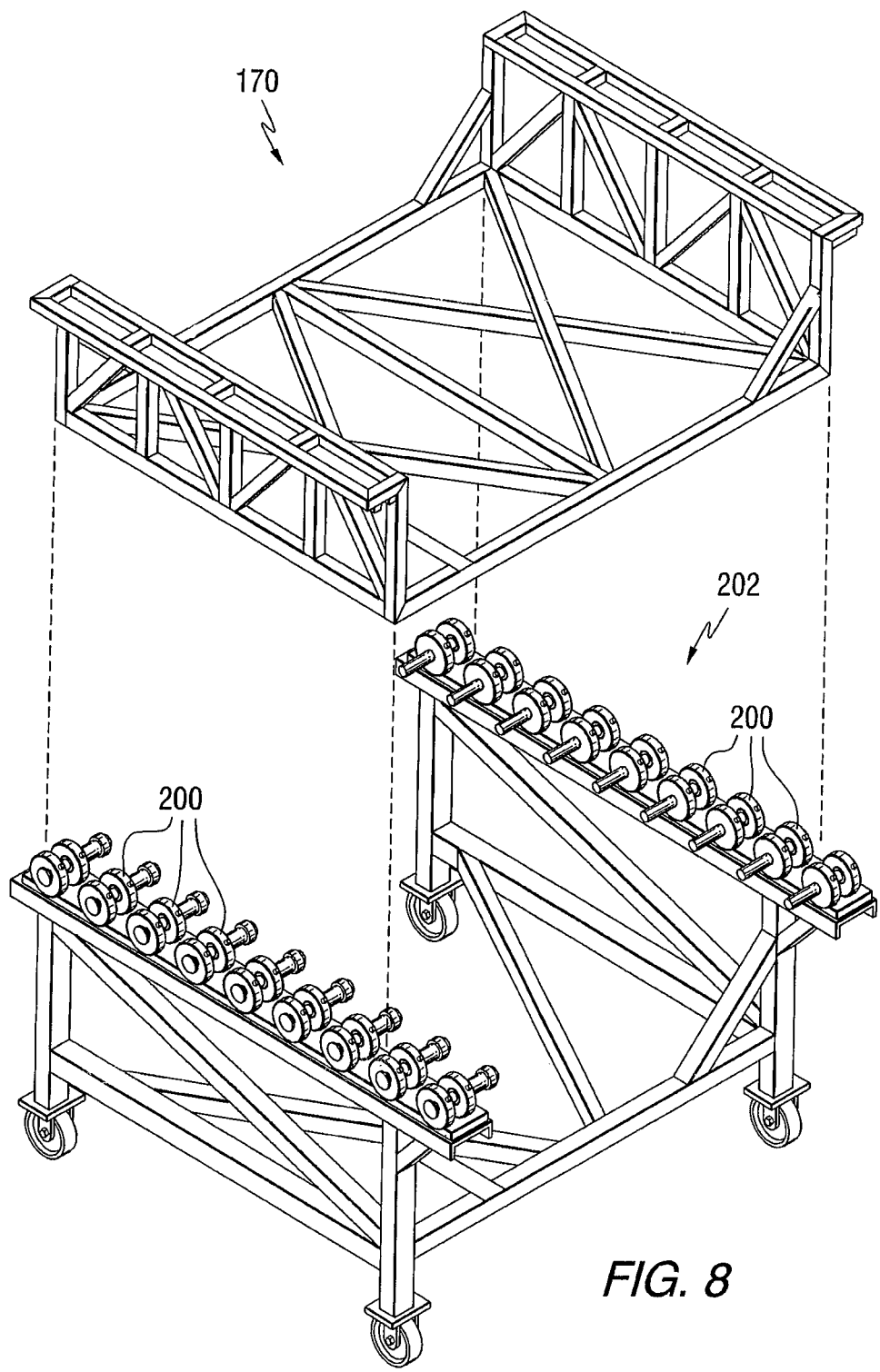
FIG. 8 is a perspective view of a carriage for supporting the bending iron, e.g., but not limited to, the bending iron shown in FIG. 4 and a moveable conveyor section to move the carriage into the entrance end of the furnace shown in FIGS. 5 and 6.

The design and construction of the first furnace 76 is not limiting to the invention and any type of furnace for heating or preheating a glass sheet to a desired temperature, e.g. a temperature below the softening, or sagging, temperature of the flat glass sheets 68 and 69 to avoid marring of the surface of the glass sheets and for controllably cooling the shaped glass sheet, e.g. but not limited to the shaped glass sheets 60 and 61 in the manner discussed below. More particularly, a preheat temperature in the range of 600-900° F. is provided for a lithium-soda-lime glass sheet, and a preheat temperature in the range of 900-1025° F. is provided for a soda-lime-silica glass sheet. The first furnace 76 can include a side wall 160 (see FIG. 6) and an opposite sidewall 162 (see FIG. 5), a top wall or ceiling 164, and a bottom wall 166 to provide the interior 88 of the furnace 76. Stub rolls 168 extended through the sidewalls 160 and 162 into the interior 88 of the first furnace 76 for moving a carriage 170 (see FIG. 8) into and out of the interior 88 of the first furnace 76, in a manner discussed below. Infrared heaters 172 are provided on interior surface 174 of the sidewalls 160 and 162 (only sidewall 162 shown in FIG. 6), interior surface 176 of the ceiling 164, and the bottom wall 166 to heat the interior 88 of the first furnace 76 to the desired temperature. Additionally, the first furnace comprises thermocouples 191 to measure the heat of the furnace. Other devices, besides thermocouples, can be employed to measure temperature of the furnaces.

The design and construction of the second furnace 78 is not limiting to the invention and any type of furnace for heating a glass sheet to a desired temperature, e.g. but not limiting to the invention, a heating temperature above 900° F. for a lithium-soda-lime glass sheet, and a heating temperature above 1025° F. for a soda-lime-silica glass sheet. Heat temperatures for glass sagging are preferred, such as in the range of 1100° F. to 1250° F. For example, portions of the glass sheet to be shaped, e.g. but not limited to the shaped glass sheets 60 and 61 (see FIG. 2) are heated to their higher shaping temperatures using microwave energy generated by a gyrotron, or any other suitable microwave energy source. With reference to FIGS. 5 and 6, there is shown a device producing ultra-high frequency, high-power electromagnetic waves 177, e.g., a gyrotron as shown, an optical box 178, and a mirror box 179 mounted on roof or ceiling 184 of the second furnace 78. The operation of the gyrotron 177, optical box 178 and mirror box 179 are discussed in greater detail below.

The second furnace 78 is similar in construction to the first furnace 76, and includes a side wall 181 (see FIG. 6) and an opposite sidewall 182 (see FIG. 5), a top wall or ceiling 184, and a bottom wall 186 (see FIG. 6) to provide the interior 90 of the furnace 78. The stub rolls 168 (see FIG. 6) extend through the sidewalls 180 and 182 into the interior 90 of the second furnace 78 for moving the carriage 170 (see FIG. 8) into and out of the interior 90 of the second furnace 78, in a manner discussed below. The infrared heaters 172 can be provided on an interior surface 188 of the sidewalls 180 and 182 (the sidewall 181 shown in FIG. 6 and the sidewall 182 shown in FIG. 5), interior surface of the ceiling 184 and the bottom wall 186 to heat the interior 90 of the second furnace 78 to a desired temperature. For a lithium-aluminum-silicate glass sheets, the interior 90 of the furnace 78 was heated to a temperature within the range of 600-900° F. and for soda-lime-silicate glass sheets, the interior 90 of the furnace 78 was heated to a temperature within the range of 900-1000° F. Generally, but not limiting to the invention, the preheat temperature of the furnace 76 and the temperature of the furnace 78 with the gyrotron de-energized are similar such that the temperature attained by the glass sheets in the furnace 76 is maintained in the furnace 78.

The temperature of the interiors 88 and 90 of the furnaces 76 and 78, respectively was measured by thermocouples 191. The thermocouples 191 forward a signal to a computer microprocessor system 193 (see FIG. 9). The computer microprocessor system 193 acts on the signal to determine the temperature of the interiors 88 and 90 of the furnaces 76 and 78, respectively. If the temperature of one or both of the furnace interiors is (are) below a set temperature, a signal is forwarded along line 195 to increase the heat input of the furnace. On the other hand, if the temperature of one or both of the furnace interiors 88 and 90 is (are) too high, a signal is forwarded along the line 195 to decrease the heat input to the furnace. If the temperature of the furnace interior is in an acceptable range no action is taken.

The conveyor system for the furnace 74 includes the stub conveyor rolls 168 of the first furnace 76 driven by a gearing arrangement 192 (see FIG. 5) including a shaft for rotating the stub rolls and a motor to power the shaft (the shaft and motor of the gearing arrangement 192 are not shown), and includes the stub conveyor rolls 168 of the second furnace 78 driven by a gearing arrangement 194 (see FIG. 5) including a shaft for rotating the stub rolls and a motor to power the shaft, the shaft and motor of the gearing arrangement 194 are not shown. As is appreciated by those skilled in the art, conveyors using stub rolls are well known in the art and no further discussion is deemed necessary.

With reference to FIGS. 3-8, as needed, at a loading station (not shown) one or more glass sheets are positioned on a bending iron, e.g. the bending iron 70 shown in FIG. 4. Two glass sheets, e.g. the glass sheets 68 and 69 (see FIG. 3), are positioned on the bending iron 70, optionally ceramic dust (not shown) can be used to prevent sticking of the shaped glass sheets 60 and 61. The bending iron 70, having the sheets 68 and 69, is positioned on the carriage 170 (FIG. 8) and the carriage 170 is placed on stub rolls 200 of a moveable conveyor 202. The moveable conveyor 202 is moved from the loading area to the furnace area. The door 92 of the first furnace 76 is opened (see FIGS. 5 and 6) and the moveable conveyor 202 is moved into the opening 80 to align the stub rolls 200 of the moveable conveyor 202 with the stub rolls 168 of the first furnace 76. The carriage 170 is then moved into engagement with adjacent stub rolls 168 of the first furnace 76, and the carriage 170 is moved into the interior 88 of the furnace 76 by the stub rolls 168 of the first furnace 76. The rotation of the stub rolls 168 is stopped when the carriage 170 is in the predetermined position in the interior 88 of the first furnace 76, which is usually the hottest position in the first furnace 76. After the rotation of the stub rolls 168 stops, the carriage 170 having the bending iron 70 and the glass sheets 68 and 69 remains in the first furnace 76 until the glass sheets 68 and 69 reach the desired temperature, e.g. the temperature for a lithium-aluminum-silicate glass is within the range of 600-900° F., and the temperature for a soda-lime-silica glass is within the range of 900-1000° F. Optionally, the carriage 170 can be moved slightly upstream and downstream along the conveyor movement path to circulate the heated air in the furnace around the sheets 68 and 69.

The temperature of the glass sheets can be monitored in any convenient manner, e.g., the temperature of the glass sheets 68 and 69 are monitored by a an optical pyrometer, or an optical thermal scanner, such as optical pyrometer or optical thermal scanner manufactured by Land Instruments International of Dronfield, UK (Land). A pyrometer or thermal scanner 204 is mounted on the roof 164 of the first furnace 76 (see FIG. 5). More particularly, a pyrometer or thermal scanner 204, e.g. but not limited to an optical thermal scanner (made by Land), measures the temperature of the glass as the carriage 170 moves toward the door 94 separating the furnaces 76 and 78. A signal is forwarded along line 204a to the computer microprocessor system 193 (see FIG. 9). If the temperature of the glass is within an acceptable preheat temperature range, e.g., at a temperature just below the temperature at which the glass sags, the carriage 170 is moved into the furnace 78. If the glass is not within the acceptable shaping temperature range, the carriage 170 is not moved into the shaping furnace 78 and appropriate action, e.g., but not limited to, increasing the temperature of the furnace 76 if the glass temperature is too low or decreasing the temperature of the furnace 76 if the glass temperature is too high, is taken.

After the glass sheets 68 and 69 reach the desired temperature, the door 94 of the second furnace 78 is opened, and the stub rolls 168 of the first furnace 76 and the second furnace 78 are energized to move the carriage 170 through the opening 84 of the second furnace 78 to a designated shaping position in the interior 90 of the second furnace 78, to be discussed in detail below. The door 94 of the second furnace 78 can be closed at any time after the carriage 170 has passed into the interior of the second furnace 78. After the carriage 170 having the glass sheets 68 and 69 and the bending iron 70 is positioned in the designated shaping position in the interior 88 of the second furnace 78, or the carriage 170 has cleared the door 94 as discussed below, the door 94 is closed, and the shaping process of the invention using the gyrotron 177 discussed in detail below is practiced.

After the glass sheets 68 and 69 are shaped, the gyrotron 177 is de-energized or deactivated, and the door 94 of the second furnace 78 is opened. The stub rolls 168 of the first and the second furnaces 76 and 78, respectively, are energized to move the carriage 170 having the shaped sheet 60 and 61 from the interior 90 of the second furnace, through the opening 84 of the second furnace 78 and into the interior 88 of the first furnace 74. After the carriage 170 is moved into the interior 88 of the first furnace 76, the door 94 of the second furnace 78 is closed. The shaped glass sheets are controllably cooled to anneal the sheets. When the annealing process is completed, the door 92 of the first furnace 76 is opened and the moveable conveyor 202 (see FIG. 8) is moved into the opening 80 of the first furnace 76 into alignment with the stub rolls 168 of the first furnace 76. The stub rolls 168 of the first furnace are energized to move the carriage 170 out of the interior 88 of the first furnace 76 onto the moveable conveyor 202. The moveable conveyor having the carriage 170 is moved to an unload station (not shown) and the shaped glass sheets are removed from the bending iron 70 in any usual manner.

The discussion is now directed to using the gyrotron 177 (see FIGS. 5, 6 and 10 as needed) to heat portions of one or more glass sheets to their bending or shaping temperature. Of note, the present application describes the use of a gyrotron system. The gyrotron is a non-limiting example and any suitable system that might be employed to spot-heat a glass sheet through a thickness of the sheet, including exterior surfaces and the interior of the sheet. Suitable systems include systems that produce ultra-high frequency, e.g., at least 20 GHz (gigahertz), and high-power, e.g., at least 5 kW (kilowatt) electromagnetic waves within the microwave spectrum. For example, such as a klystron or a traveling wave tube, though the output frequency and wattage of these devices are less than that of a gyrotron system. As previously discussed, glass for aircraft transparencies are made using the cut-after-bend process to remove portions of the glass sheets having optical distortions, e.g. but not limiting thereto resulting from long periods of time required for the glass sheets to rest on the bending iron to attain the desired temperature for bending. For example, it is expected that the overheating of the surface of the glass sheet using traditional methods, in order to achieve a desired bending of the glass, is rendered unnecessary by use of the gyrotron or other source of high-energy electromagnetic radiation. Glass sheet surface temperature can be reduced by 30-40% using a gyrotron to internally heat selected portions of the glass sheets to their bending or shaping temperature. As can now be appreciated, it is expected that the reduction of the need to overheat the glass surface by traditional methods of regulating furnace temperature, and the resultant elimination of overheating of the bending irons and/or shaping rails on which the glass sheet sits, significantly reduces glass marring, and greatly facilitates bending of glass sheets for, e.g., aircraft transparencies using the cut-to-size process instead of the cut-after-bend process.

Figure 10:
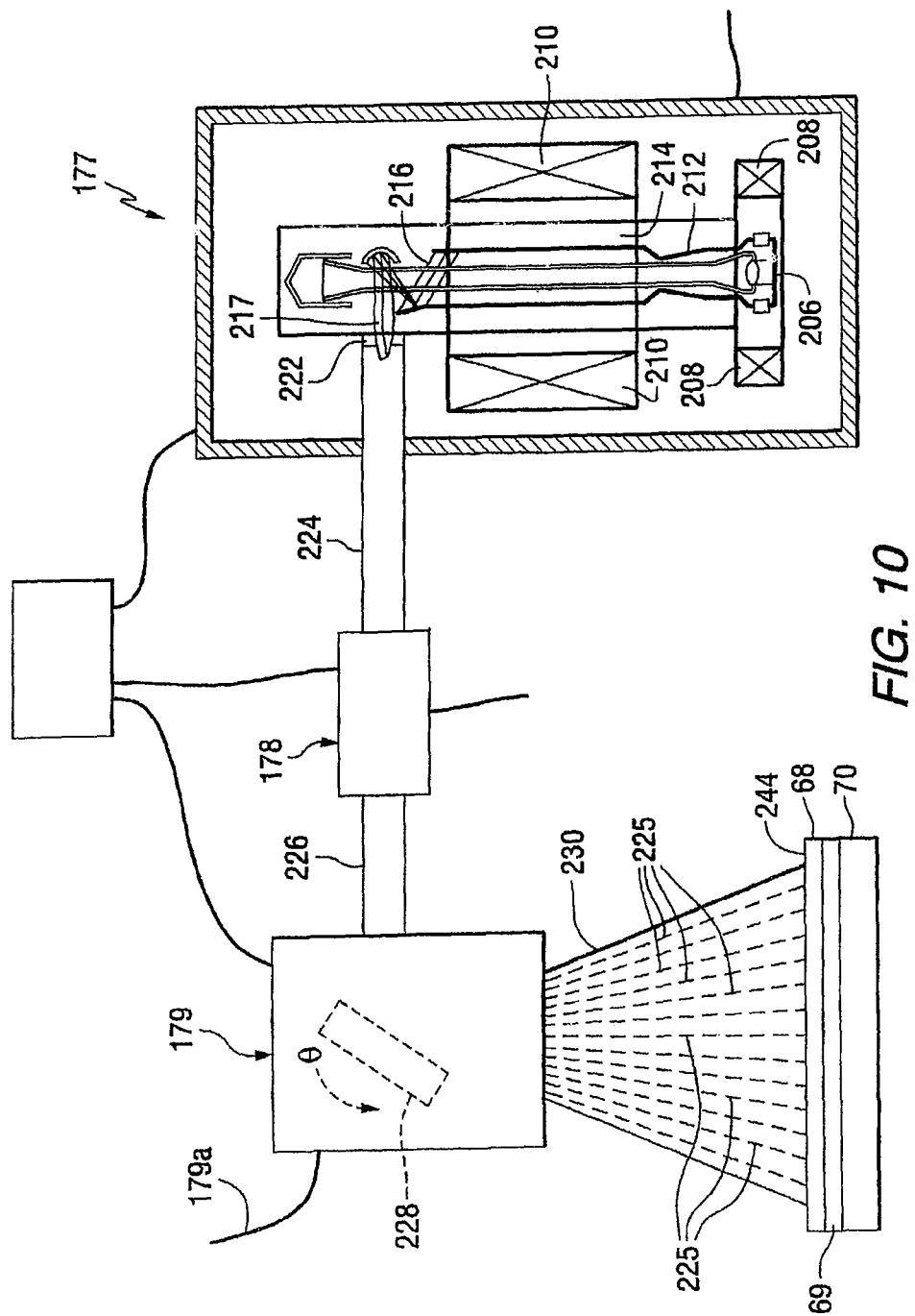
FIG. 10 is a schematic partially in cross section showing a gyrotron that can be used in the practice of invention to heat selected portions of a glass sheet.

A gyrotron is a high-powered linear beam vacuum tube capable of generating high-power, high-frequency electromagnetic radiation approaching the edge of the infrared terahertz (THz) spectrum. Its operation is based on the stimulated cyclotron radiation of electrons oscillating in a strong magnetic field, e.g. as provided by a superconducting magnet. Any suitable microwave generator capable of generating high-power, high-frequency electromagnetic waves, such as a microwave generator having an output frequency ranging from 20 GHz to 300 GHz, and having a power output of at least 5 kW, would be suitable. A schematic, indicating the various parts of the gyrotron 177 is shown in FIG. 10. In general and not limiting to the invention, in the operation of the gyrotron 177, electrons that are emitted by a cathode 206 surrounded by gun coil magnets 208, are accelerated in a strong magnetic field of a superconducting magnet 210. While an electron beam 212 travels through the intense magnetic field of magnet 210, the electrons start to gyrate at a specific frequency given by the strength of the magnetic field. In a cavity 214, located at the position with the highest magnetic field strength, the THz radiation is strongly amplified. Mode converter 216 is used to form free-gaussian beams 217 that leave the gyrotron 177 through a window 222 and is coupled to a waveguide 224. The operation of gyrotrons is well known in the art and no further discussion is deemed necessary. Gyrotrons are commercially available from, e.g., Gyrotron Technology, Inc. of Philadelphia, Pa.

With continued reference to FIG. 10, the free-gaussian beams 217 pass through the waveguide 224 to the optical box 178. The optical box 178 has mirrors (not shown) arranged as is known in the art to collimate the free-gaussian beams 217 into a single beam 225 and control the size, e.g. the diameter, of the beam 225. The collimated beam 225 leaves the optical box 178 through waveguide 226 and passes into the mirror box 179. The mirror box 179 has one or more moveable mirrors 228 (one mirror shown in phantom in FIG. 10) to move the beam 225 through a predetermined area defined by a cone 230 (see FIGS. 6 and 10). In FIG. 10, the beams 225 moving through the cone 230 are incident on the flat glass sheet, e.g. the flat glass sheets 68 and 69 positioned on a bending iron, e.g. the bending iron 70 (FIG. 4). The sheets 68 and 69 and the bending iron 70 are shown in block diagram in FIG. 10.

The discussion is now directed to using the beam 225 from the gyrotron 177 to heat portions 232 of the flat glass sheets 68 and 69 (see FIG. 3) that are shaped by an articulating arm 234 of the bending iron 70 (FIG. 4) and portions 236 shaped by the fixed shaping rail 238 of the bending iron 70. In general, the flat glass sheets 68 and 69 positioned on the shaping rail 239 of the articulating arm 234 maintain the articulating arm 234 in a down position as viewed in FIG. 4, which maintains weight 240 in the up position. As the portion 232 of the glass sheets 68 and 69 overlaying the shaping rail 239 of the articulating arm 234 of the bending iron 70 is heated to the shaping temperature of the glass sheets 68 and 69, the weight 240 moves downwardly, moving the articulating arm 234 upwardly to shape the portion 232 of the glass sheet 68 and 69 to the shape 232 shown on the sheets 60 and 61 in FIG. 2. For a more detailed discussion of the operation of the articulating arm 234 of the bending iron 70, reference should be made to USPA '494. The portions 236 of the flat glass sheets 68 and 69 are shaped by the fixed shaping rails 238 to the portions 236 of the shaped glass sheets 60 and 61. In the practice of the invention, the portions 232 and 236 of the glass sheets 62 are heated by the beams 225 from the gyrotron 177 to quickly reach the bending temperature in the range of 1000 to 1100° F. for lithium-aluminum-silicate glass and in the range of 1100 to 1200° F. for soda-lime-silicate-glass.

Figure 11:
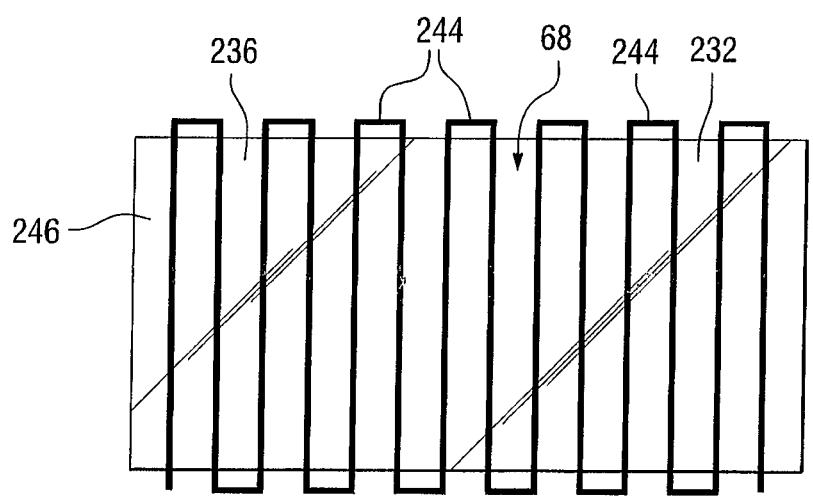
FIG. 11 is a plan view showing the path of the microwave beam of the gyrotron to selectively heat portions of a stack of one or more glass sheets.
Figure 9:
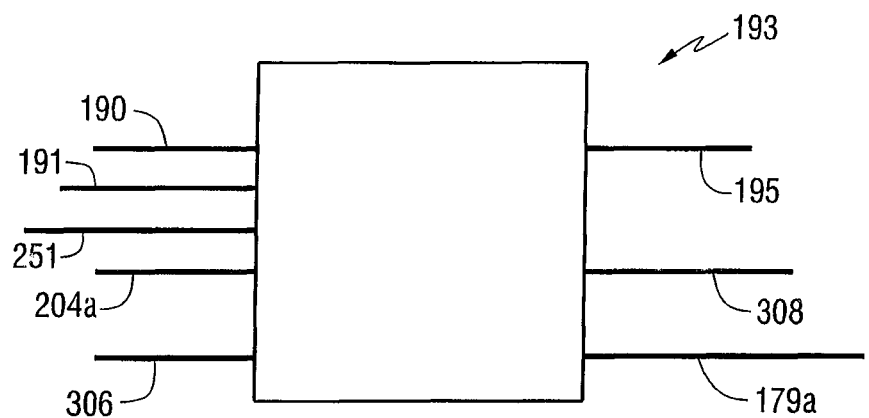
FIG. 9 illustrates a microprocessor for receiving signals from sensors and acting on the signals in accordance to the teachings of the invention.

The microprocessor or computer system 193 (FIG. 9) is programmed e.g., but not limited to a signal sent along wire 239, to control the operation of the mirrors of the optical box 178 to set the size of the beam 225 incident on the portions of the glass sheets being shaped, the movement of the mirror 228 of the mirror box 179 to control the direction of movement and speed of movement of the beam 225 in the zone 230 (se FIG. 10), and the energy of the beam 225 by altering the anode voltage, strength of the magnetic field and/or the voltage applied to the system of the gyrotron. With reference to FIGS. 9 and 10 as needed, the mirror 228 operated by the microprocessor 193 moves the beam 225 along a predetermined path 244 on surface 246 of the top glass sheet, e.g. top glass sheet 68 facing the mirror box 179. The energy beam 225 as it moves along the path 244 in the area of the sheets designated by the number 236, heats the glass sheets to their softening temperature for the glass sheets to take the shape of the fixed shaping rail 238 (see FIG. 4). The energy beam 225 as it moves along the path 244 in the area of the sheets designated by the number 232 (see FIG. 11) heats the glass sheets to their shaping temperature, at which time the articulating arm 234 of the bending iron 70 shapes the sheets in the area 232. Mounted through the roof 180 of the furnace 78 on each side of the mirror box 177 are pyrometers 250 (see FIG. 6) to monitor the temperature of the glass. The pyrometers 250 are connected to the microprocessor or computer 193 by wires 251 to send a signal to the microprocessor 193, and the microprocessor forwards a signal along the wire 239 to maintain the temperature of the selected portions of the glass within a desired temperature range by altering the speed of the beam 225 along the path 244 and/or by altering the energy of the beam as discussed above. More particularly, decreasing the speed of the beam 225 increases the temperature of the glass and vice versa, and increasing the anode voltage, the magnetic field, and/or the applied voltage, increases the temperature of the glass and vice versa.

The following is an example of the invention to shape a glass sheet for use in the manufacture of an aircraft transparency. The flat glass sheets 68 and 69 (FIG. 3) are positioned on the bending iron 70 (FIG. 4). The bending iron 70 is placed in the carriage 170 (FIG. 7) and the carriage is placed on the stub rolls 200 of the conveyor 202. The carriage 170 having the bending iron 70 and glass sheets 68 and 69 is moved into the interior 88 of the first furnace 76 (FIG. 6) by the stub rolls 168 of the first furnace 76. The glass sheets in the closed interior of the first furnace 76 are heated to a temperature below the softening point temperature of the glass. Thereafter, the carriage 170 having the heated glass sheets 68 and 69 is moved by the stub rolls 168 of the first furnace 76 and the second furnace 78 into the interior 90 of the second furnace 78 and positioned within the area of the cone 230 (see FIGS. 6 and 10).

The temperature of the interior 90 of the second furnace 78 is generally the same temperature as the interior 88 of the first furnace 76, i.e. a temperature below the shaping temperature of the glass sheets on the bending iron 70. At this temperature, the glass sheets positioned on the bending iron have not been shaped. After the carriage 170 positions the sheet within the cone 230, the gyrotron 177, the optical box 178, and the mirror box 179, are energized to move the beam 225 along the scan path 244 (see FIG. 10). As the beam 225 moves along the scan path 244, the gyrotron 177 is in a work mode. The energy beam 225 as it moves along the path 244 in the area of the sheets designated by the number 236, heats the glass sheets to their softening temperature for the glass sheets to take the shape of the fixed shaping rail 238 (see FIG. 4). The energy beam 225 as it moves along the path 244 in the area of the sheets designated by the number 232 (see FIG. 9) heats the glass sheets to their shaping temperature, at which time the articulating arm 234 of the bending iron 70 shapes the sheets in the area 232. As the beam moves along the segments 250 of the scan path, the beam is in the work mode to heat the segment 232 of the sheet 68. As the segment or portion 232 of the sheet 68 is heated the sheet segment softens and the weight 240 of the bending iron moves the articulating rail 238 upwardly to shape the portion 232 of the sheet 268. After the sheets are shaped, power to the gyrotron 177 is reduced or disconnected to put the gyrotron and beam 225 in the idle mode.

The stub rolls 168 of the second and first furnaces 78 and 76, respectively, move the carriage 170 having the shaped sheets 60 and 61 from the interior 90 of the second furnace 78 into the interior 88 of the first furnace 76. The shaped sheets in the first furnace 76 are controllably cooled to anneal the shaped glass sheets. Thereafter the carriage 170 is moved by the stub rolls 168 of the first furnace 76 onto the moveable conveyor 202, and the moveable conveyor moved to an unload area (not shown).

As can now be appreciated, care is exercised to make certain the carriage 170 (see FIG. 9) is moved into the furnaces 76 and 78, and between the furnaces 76 and 78, when the doors 92 and 94 (see FIGS. 5 and 6) are open. As a safety feature, tracking sensors 300, 302 and 304 were used to track the position of the carriage 170 as it moved through the furnaces 76 and 78. Although not limiting to the invention, each of the tracking sensors 300, 302 and 304 included a generated continuous light beam, e.g., but not limited to, a laser generated beam of light incident on a detector. When the carriage 170 moved through the continuous light beam, the beam was directed away from the detector and the detector sends a signal along a cable 306 to the microprocessor 193 indicating that the light beam was not incident on the detector. The computer microprocessor system 193 sends a signal along a wire 308 to open or close the door 92 or the door 94. By way of illustration and not limiting to the invention, the tracking detector 300 is positioned in the furnace 76 spaced from the door 92 a distance greater than the width of the carriage 170. The travel of the beam of light is transverse to the path of travel of the carriage 170. As the carriage 170 moves into the furnace 76, the carriage 170 interrupts the light beam by directing the beam away from the detector of the sensor 300. The detector of the tracking sensor 300 sends a signal along the cable 306 to the microprocessor 193 indicating that the light beam is not impinging on the detector and the microprocessor sends a signal along cable 308 to energize the motor 124 (see FIG. 5) to close the door 92.

Optionally, the glass sheets 68 and 69 are heated as the carriage 170 moves through the furnace 76, or the glass sheets 68 and 69 are moved to the center of the furnace and stopped to heat the sheets. After the glass sheets are heated, the glass sheets 68 and 69 (see FIG. 3) and the carriage 170 are moved toward the door 94 separating the furnaces 76 and 78. The carriage interrupts the light beam of the sensor 302 and a signal is forwarded along the cable 308 to computer microprocessor system 193 to energize the motor 145 to raise the door 94. The system is timed such that the carriage 170 can continuously move from the first furnace 76 into the second furnace 78 without any interruptions. The carriage 170 moves into the furnace 78 and after completely entering the furnace 78 interrupts the light beam of the sensor 304. The sensor 304 forwards a signal along cable 308 to the microprocessor 193 to close the door 94; the microprocessor 193 forwards a signal along the cable 308 to energize the motor to close the door 94. The carriage 170 is moved into the shaping position and the conveyor stops. As can be appreciated the distance from the shaping position to the beam of light of the detector 304, and the speed of the carriage 170 are known, and in this fashion the motion of the conveyor can be stopped when the carriage and the glass sheets are in the shaping position. In another example of the invention, a tracking sensor 309 (shown in phantom and only shown in FIG. 6) is used to position the carriage 170 in the shaping position. As the carriage 170 displaces or interrupts the light beam of the tracking sensor 309, a signal is forwarded, e.g. along the cable 306 to the computer microprocessor system 193 and the computer microprocessor system forwards a signal, e.g. along the cable 308 to stop the rotation of stud rolls to position the carriage 170 and the glass sheets in the shaping position. Optionally, the sensor 309 and the timing of the computer microprocessor system can be used for positioning the carriage relative to the beams.

After the glass sheets 68 and 69 are shaped, the carriage 170 and the shaped sheets are moved out of the furnace 74. More particularly and not limiting to the invention, the carriage 170 deflecting or interrupting the light beam of the sensor 304 opens the door 94, interrupting the light beam of the detector 302 closes the door 94, and interrupting the light beam of the detector 300 opens the door 92.

Figure 12:
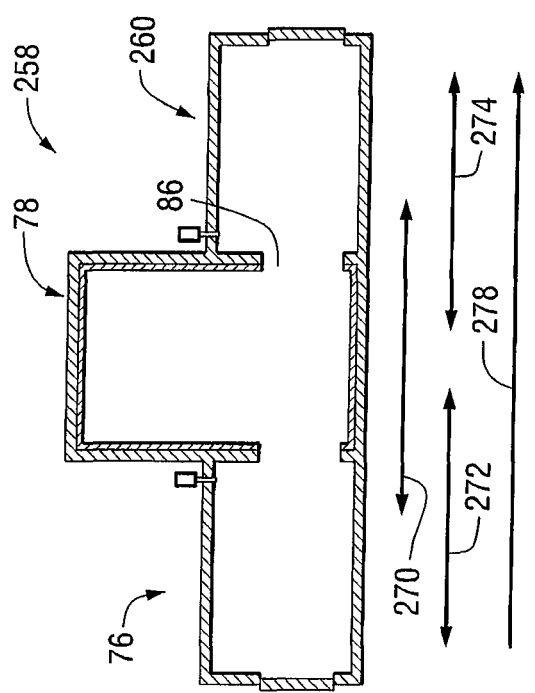
FIG. 12 is an elevated cross sectional side view of a furnace system incorporating features of the invention that can be used in the practice of the invention to, among other things, heat and shape glass sheets.

As can be appreciated, the invention is not limited to the design of the furnace 74, and the invention contemplates practicing the invention with any type of furnace such as, but not limited to the furnaces shown in FIGS. 5 and 6 discussed above, and FIGS. 12-15 discussed below. More particularly, shown in FIG. 12 is a furnace 258 having the first and second furnaces 76 and 78, respectively, discussed above and a furnace 260 attached to the second opening 86 of the second furnace 78 (see FIGS. 5, 6 and 12). The furnace 260 is similar, if not identical, to the first furnace 76. With the furnace arrangement shown in FIG. 12, the carriage 170 having the bending iron 70 having the sheets 68 and 69 can move along the path designated by the arrow 270 through the furnace 76 to preheat the glass sheets 68 and 69, through the furnace 78 to shape the glass sheet 68, and through the furnace 260 to anneal the shaped glass sheets 60 and 61 as discussed above for the first furnace 76. In a second example of the invention, the furnace 258 can shape the glass sheets 68 and 69 using the first and second furnaces 76 and 78, respectively, as discussed above by moving the carriage 170 having the bending iron 70 and the glass sheets 68 and 69 along a reciprocating path designated by the arrow 272 and shaping second group of glass sheets 68 and 69 using the furnaces 78 and 260 in a similar manner as the furnaces 76 and 78, and moving the second group of glass sheets along a reciprocating path designated by the arrow 274.

Figure 13:
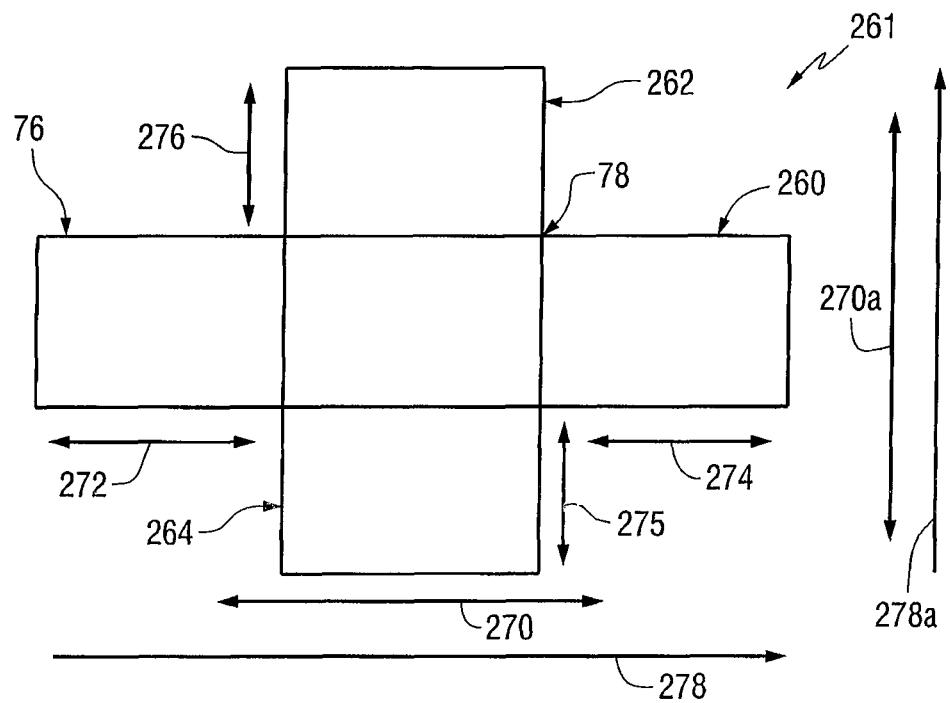
FIG. 13 is an elevated plan view of a furnace system incorporating features of the invention that can be used in the practice of the invention to, among other things, heat and shape glass sheets.

With reference to FIG. 13, there is shown another example of a furnace designated by the number 261. The furnace 261 includes the furnaces 76, 78 and 260 (see FIG. 12) and furnaces 262 and 264. The shaping furnace 78 is between the furnaces 262 and 264. The glass processed using the furnace 261 has paths of travel 270 and 278 in the horizontal direction and paths of travel 270*a* and 278*a* in the vertical direction, as viewed in FIG. 13; the reciprocal paths of travel 272 and 274, and reciprocal paths of travel 275 and 276 in the vertical direction as viewed in FIG. 13. The glass sheets moving along the path of travel 276 can move into and out of the furnaces 262 and 78, and the furnaces 264 and 78. As can be appreciated, the conveying system for the furnace 78 shown in FIG. 13 is adjustable or provided with a two tier conveying system to move the carriage along the path 278 through the furnaces 262, 78 and 262, and to move the carriage along the path 278*a* through the furnaces 76, 78 and 260.

Figure 14:
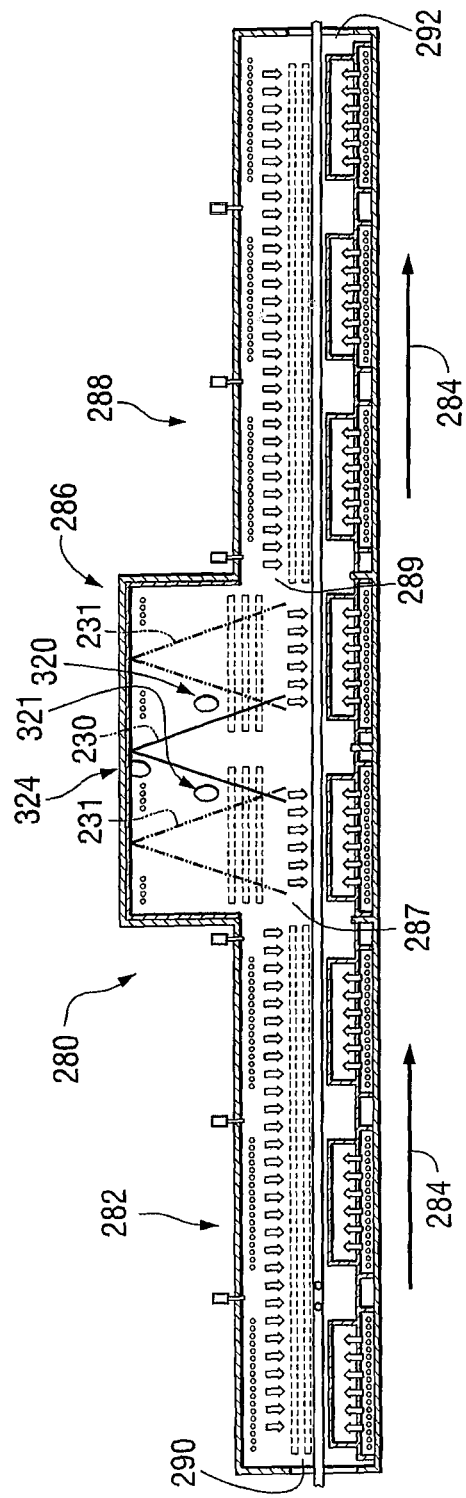
FIG. 14 is an elevated cross sectional view of a furnace of the invention that can be used in the practice of the invention to, among other things, heat and shape glass sheets.

With reference to FIG. 14, there is shown still another non-limiting embodiment of a furnace of the invention designated by the number 280. The furnace 280 includes a first tunnel furnace 282 to preheat the flat glass sheets 68 and 69 as they move in the direction of the arrow 284. The glass sheets 68 and 69 can be positioned on the bending iron 70, or as discussed above, the bending iron 70 can be positioned in the carriage 170. Shaping furnace 286 positioned at exit end 287 of the tunnel furnace 282 can have any number of gyrotrons to provide any number of shaping zones, e.g. one shaping zone 230 shown in solid line, or two shaping zones 231 shown in phantom, or three shaping zones shown in solid line 230 and phantom 231. A second tunnel furnace 288 is connected to exit end 289 of the shaping furnace 286 to controllably cool the shaped glass sheets 60 and 61. Additionally depicted are thermal sensor 324 and positional sensors 320 and 321.

Thermal sensor 324 is any sensor or scanning device, such as an IR scanner or IR imaging sensor, able to produce data representing the temperature of one or more portions of a glass sheet, such as a charged-coupled device (CCD), an infrared laser-light sensor device, a thermal imaging device or a thermal scanner, as are broadly known and commercially available. Representations of a glass sheet can be produced by a computer implemented process, by assembling data, such as raw CCD data, obtained from the thermal sensor, and producing a two-dimensional or three-dimensional temperature profile of at least a portion of the glass sheet. As indicated below, the thermal data obtained from the thermal sensor, and the temperature profile produced from that data is compared to a reference temperature profile in a computer-implemented process, and any differences between the produced temperature profile and the reference temperature profile are triggers selective heating of the glass sheet by the gyrotron to match the temperature profile of the glass sheet with that of the reference temperature profile. Computer-implemented processes to perform these tasks, as well as any task indicated herein are readily devised and implemented by those of ordinary skill in the computer imaging and process control arts. One or more thermal sensors can be used, and more than one different type of sensor may be employed to obtain an accurate and useful real-time thermal profile of a glass sheet.

Positional sensors 320 and 321 are any device able to produce data representing the shape of a glass sheet. Non-limiting examples of positional sensors are CCDs and laser-light sensors, as are broadly known and commercially available. Data is obtained from the positional sensors 320 and 321 and is assembled by a computer-implemented process to produce a shape profile of a glass sheet in the furnace 78. As indicated below, the positional data obtained from the positional sensor, and the shape profile produced from that data is compared to a reference shape profile in a computer-implemented process, and any differences between the produced shape profile and the reference shape profile triggers selective heating of the glass sheet by the gyrotron to match the shape profile of the glass sheet with that of the reference shape profile. Any number of positional sensors can be used, so long as meaningful data is obtained relating to the real-time shape profile of the glass sheet during the bending process. Likewise, more than one type of positional sensor can be used to obtain the produced shape profile so as to obtain an accurate and useful real-time representation of the glass sheet during the bending process. For example, two CCDs may be used to generate a stereoscopic shape profile of a glass sheet, while one or more laser distance sensor is used to determine the spatial location or orientation of one or more points on the surface of the glass sheet in order to best determine the degree of bending of the glass sheet at any time.

The obtaining and processing of thermal and shape data, and the use of those data to produce temperature and shape profiles may be repeated one or more times during the bending process, e.g., at intervals ranging from every 0.0001 to 60 seconds, including every 0.0001, 0.001, 0.01, 0.1, 0.5, 1, 2, 5, 10, 15, 20, 30 and 60 seconds including any increment therebetween. Even shorter time intervals are contemplated, and are only limited by the throughput (e.g., processing power) of the computer system. The gyrotron system may not be able to respond to the computer system as quickly as the computer system can analyze data, so scanning intervals may be set based on the responsiveness of the gyrotron system. That said, the scanning and analyzing of thermal and optionally spatial profiles can be performed at faster rates than the controlling of the gyrotron, within limits of the pertinent hardware.

As is appreciated by those skilled in the art, during the shaping of the sheets, the entrance opening 290 of the first tunnel furnace 282 and the exit opening 292 of the second tunnel furnace 288 can remain open. The doors to enter and leave the shaping furnace 286 are preferably opened to move the glass sheets to be shaped into and out of the furnace 288, and during the shaping of the glass sheets in the shaping furnace 286, the doors (see FIGS. 5 and 6) are closed to minimize heat loss during the sheet shaping process. Optionally and within the scope of the invention, the doors of the tunnel furnace can remain open for continuous movement of the glass sheets through the tunnel furnace to shape the glass sheets.

Figure 15:
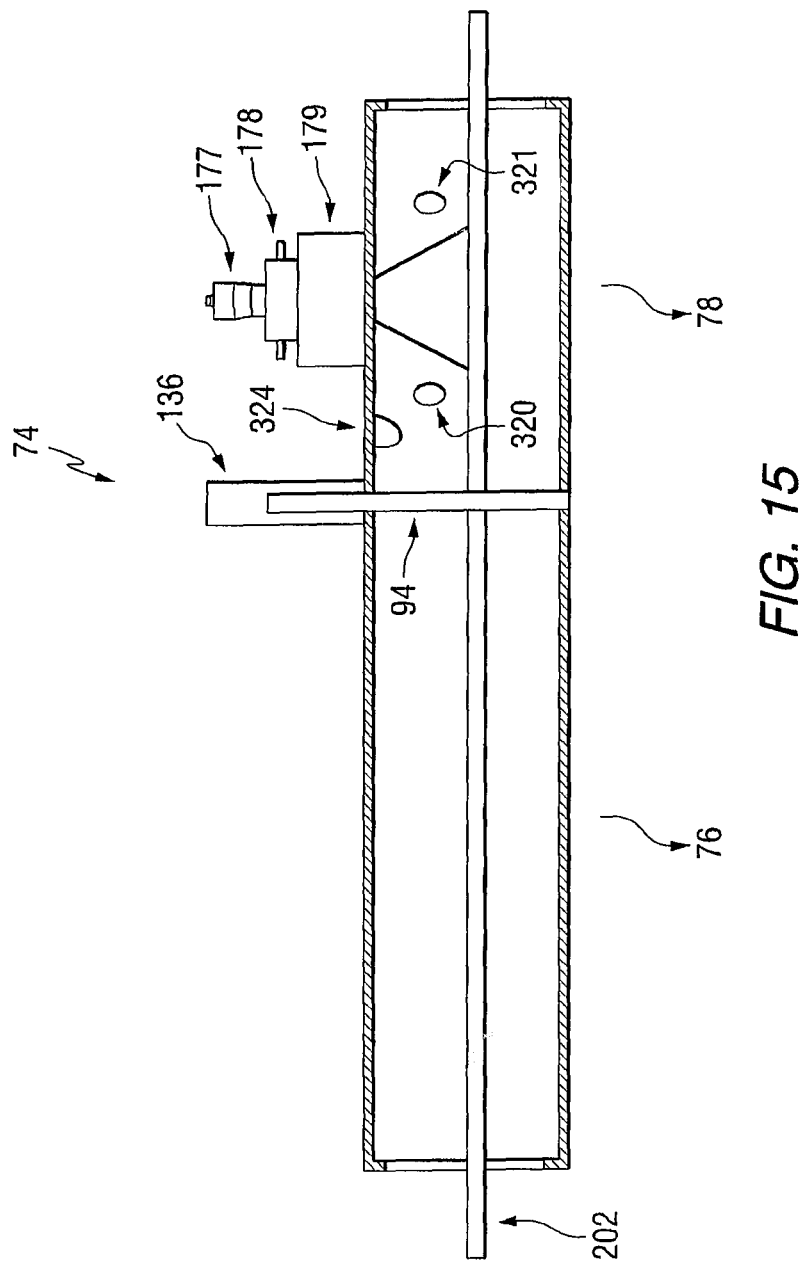
FIG. 15 is an elevated cross sectional view of a furnace system of the invention.

FIG. 15 shows schematically an example of the furnace system of FIG. 6. Details of FIG. 6 that are unnecessary to show operational and structural differences between the furnace of FIG. 6 and that of FIG. 15 are omitted for ease of visualization, but are included in FIG. 15. As in FIG. 6, the furnace system 74 of FIG. 15 includes a first chamber 76, a second chamber 78, and a door 94 supported by a U-shaped member 136. The first chamber 76 preheats, through the use of infrared heaters, a glass sheet carried on conveyor 202, to a temperature within the range of 900-1000° F., although other suitable preheat temperatures may be utilized depending on the material of the glass sheet. In use, the glass sheet is supported or positioned on a bending iron (not shown, but as depicted and described herein). The second chamber 78, also herein referred to as a shaping chamber, selectively heats portions of the flat glass sheets to achieve a desired shape of the glass sheet. Infrared heaters of the second chamber 78 maintain the temperature of the chamber to about 1000-1100° F., or any temperature just below a shaping or sag temperature of the glass sheet. Specific portions of the sheet of glass are selectively heated in the second chamber 78 by a gyrotron beam system, including a gyrotron 177, an optical box 178, and a mirror box 179. A benefit of the use of a high-energy microwave system described herein is that the microwave source, e.g., gyrotron, heats the glass sheet internally, and at precise locations on the glass sheet. On the other hand, traditional infrared heaters heat only the glass surface and through heat conduction, the energy passes into the glass. As a result, under traditional infrared heating the glass surface is significantly hotter than the internal glass temperature, hence increasing the likelihood of undesirable manufacturing conditions for glass bending. By "selective heating" it is meant that, the gyrotron beam system is directed to heat specific areas, portions, or locations of the glass to cause the glass sheet to sag, to produce a desired shape. Once the glass sheet is shaped to a desired specification, it is controllably cooled. In the embodiment shown, the first chamber 76 also serves as a cooling chamber for annealing the glass sheet, such that once the glass sheet is shaped in the second chamber 78, it is returned to the first chamber 76, where it is cooled in a controlled manner. The furnace system 74 can include a third chamber on an opposite side of the second chamber 78 from the first chamber 76, and the conveyor 202 passes the glass sequentially from the first chamber 76, through the second chamber 78, to the third furnace. The furnace system 280 of FIG. 14 depicts an analogous orientation. Inclusion of a third furnace may simplify the process in that the glass sheet is able to move through the system in a linear manner. The third furnace is a cooling chamber which is able to controllably cool the shaped glass sheet to anneal the shaped glass sheet. The third furnace may be modified such that the shaped glass sheet can be thermally tempered or heat strengthened.

In addition to, or in lieu of, the pyrometer 204 shown in FIG. 6, an infrared sensor 324 can be provided. The pyrometer 204 and/or the infrared sensor 324 monitor the temperature of the whole sheet of glass and/or specific portions of the glass. As used herein, a "portion" is an amount less than a whole or 100% of an object and can be a point, line, area, region, etc. on and/or in an object, such as a glass sheet.

The methods and systems described herein in one aspect rely on a computer, for example like, but not limited to, a microprocessor 193, at least for monitoring and controlling progress of the heating and bending of the glass sheets described herein. A computer or computer system can take any physical form, such as a personal computer (PC), credit-card computer, personal digital assistant (PDA), smartphone, tablet, workstation, server, mainframe/enterprise server, etc. The terms computer, computer system, or microprocessor system, or computer microprocessor system are herein used interchangeably. A computer includes one or more processors, e.g. a central processing unit (CPU), which carries out instructions for the computer. A computer also includes memory, e.g., RAM and ROM (storing, e.g., the UEFI or BIOS), connected to the processor by any suitable structure such as a system bus. Computers also comprise non-transient storage for storing programming and data, in the form of computer readable medium/media, such as a hard drive, a solid state drive (SSD), an optical drive, a tape drive, flash memory (e.g., a non-volatile computer storage chip), a cartridge drive, and control elements for loading new software. Computer systems as described herein are not limited by any topology or by the relative location of the various hardware elements, recognizing the varied physical and virtual structures those of ordinary skill employ in implementing a computer system.

Data, protocols, controllers, software, programs, etc., may be stored locally in the computer, e.g., in a hard drive or SSD; within a local or wide-area network, e.g., in the form of a server, a network associated drive (NAS); or remotely, such that connection is made over an internet connection, e.g., via remote access. Data, such as images, temperature profiles or shape profiles produced or used by the methods and systems described herein may be organized on computer readable media in a database, which is an organized collection of data for one or more purposes. Other exemplary hardware that form elements of a typical computer, include input/output devices/ports, such as, without limitation: Universal Serial Bus (USB), SATA, eSATA, SCSI, Thunderbolt, display (e.g., DVI or HDMI) and Ethernet ports, as are broadly known, and graphics adaptors, which may be an integral part of the CPU, a subsystem of the motherboard, or as separate hardware device, such as a graphics card. Wireless communications hardware and software, such as Wi-Fi (IEEE 802.11), Bluetooth, ZigBee, etc. may also be included in the computer. Elements of a computer need not be housed within the same housing, but can be connected to a main computer housing via any suitable port/bus. In a typical computer, at least the CPU, memory (ROM and RAM), input/output functionality, and often a hard drive or SSD and a display adaptor are housed together and are connected by a high-performance bus of any useful topology.

The computer, having storage and memory capabilities, can include controller aspects that allow for the design, storage, and execution of instructions, executable for independently or collectively instructing the computer system to interact and operate as programmed, referred to herein as "programming instructions". In the context of computing, a computer-implemented process (i.e., program), broadly speaking, refers to any computer-implemented activity that generates an outcome, such as implementation of a mathematical or logical formula or operation, algorithm, etc.

One example of a controller is a software application (for example, basic input/output system (BIOS), unified extensible firmware interface (UEFI), operating system, browser application, client application, server application, proxy application, on-line service provider application, and/or private network application) installed on the computer system for directing execution of instructions. In one example, the controller is a WINDOWS™-based operating system. The controller may be implemented by utilizing any suitable computer language (e.g., C \C++, UNIX SHELL SCRIPT, PERL, JAVA™ JAVASCRIPT, HTML/DHTML/XML, FLASH, WINDOWS NT, UNIX/LINUX, APACHE, RDBMS including ORACLE, INFORMIX, and MySQL) and/or object-oriented techniques.

The controller can be embodied permanently or temporarily in any type of machine, component, physical or virtual equipment, storage medium, or propagated signal capable of delivering instructions to the computer system. In particular, the controller (e.g., software application, and/or computer program) may be stored on any suitable computer readable media (e.g., disk, device, or propagated signal), readable by the computer system, such that if the computer system reads the storage medium, the functions described herein are performed.

The computer contains a "protocol", that is instructions and data that control e.g., the bending process for a glass sheet. Various modeling techniques may be used to develop protocols and may be implemented as part of a computer-implemented protocol. Modeling techniques include scientific and mathematical models, specific for glass bending processes, which are able to determine the required temperatures at different stages of the process necessary to achieve a final glass sheet of high-quality. For example, the preheat temperature at the exit of the first furnace, glass forming/bending temperature profile in the glass forming furnace, exit glass temperature once the forming process is complete, and the glass annealing temperature. The protocol controls the gyrotron beam system to establish a heating profile to achieve a specific shape for a glass sheet. A gyrotron beam can be manipulated in various ways, such as, altering the path, speed, width, shape, frequency, dwell time at a location (position on the glass sheet), or intensity/energy (e.g., kilowatts, kW) of the gyrotron beam. In one embodiment, beam width, beam shape, intensity/energy and frequency is constant, but the location, path, speed and/or dwell time at a location of gyrotron beam are altered to provide a desired heating profile on the sheet. In another example, the gyrotron beam's electrical power can be manipulated, while the beam is moving at a constant speed across the surface of the glass sheet to produce desired heat profile. In another example, one can change both the electrical power and beam speed to achieve the same effect. The protocol comprises instructions at least for controlling any or all possible parameters of the gyrotron beam, such as: location, path, intensity/energy, speed, beam shape, beam diameter, and output frequency, which may be controlled by the gyrotron unit or the post-gyrotron optics. As such, a protocol controls the heat-profile and/or heat distribution on a glass sheet for attaining a desired shape and size of the sheet of glass. Included as part of the protocol, the computer receives and processes real-time data from the thermal and positional sensors, particularly the thermal sensor and, optionally the positional sensor. The computer then produces a temperature profile, and optionally a shape profile from the real-time data. The temperature profile and shape profile are merely representations in the computer that can be compared to reference temperature and shape profiles stored in association with the bending protocol. The computer system compares produced profiles to the reference profiles to determine differences between the produced profiles and the reference profiles at one or more locations on the glass sheet, and, if differences are present and one or more positions on the glass sheet require heating to match the temperature and shape of the glass sheet to the reference profiles, the computer controls one or more parameters of the gyrotron beam to selectively heat a portion of the glass sheet to correct those differences. In addition to the above, optionally, the computer receives additional temperature data from one or more temperature sensors, such as thermocouples or IR scanners of one or more chambers and/or furnaces of the system according to any examples described herein, and acts as a thermostat, monitoring and adjusting the ambient temperature of the chamber, e.g., by adjusting the output of IR heaters, blowers, etc. utilized in the system. For example, in one aspect, thermocouples (e.g., as shown in FIG. 6) detect the temperature of the second furnace 78, as shown in FIG. 15. If the second furnace 78 is not at the desired temperature, the computer, using computer-implemented processes for example as described above, compares the actual ambient temperature of the second furnace 78 to a stored reference ambient temperature for the second furnace 78, and automatically adjusts the heat of the second furnace 78 in order to reach the stored reference ambient temperature. By "ambient temperature" in reference to the furnaces described herein, it is meant the temperature of the atmosphere at one or more points within the furnace, and does not refer to the temperature of the glass sheet.

In another aspect, the thermal sensor 324 is an IR laser-light sensor that captures an IR image of the glass sheet being bent, which is sent to the computer, which compares the captured image to a reference image stored as part of a glass bending protocol for the particular glass sheet, and, if a position on the glass is at a temperature lower than that of the same position in the image stored as part of a glass bending protocol, the gyrotron beam is directed to heat that position until the temperature of the position matches the reference temperature of the image stored as part of a glass bending protocol. As used herein, a protocol for producing a specific shape from a glass sheet contains one or more reference temperature distribution profiles and shape profiles for the specific shape and glass sheet at one or more time points during the bending process.

FIG. 15 also depicts optional positional sensors 320. A suitable light source to provide illumination of the glass sheet to the extent necessary to permit imaging also may be employed, though heated glass typically emits enough light for imaging purposes. The positional sensor(s) comprises a single unit or multiple units that allow for either image capture or capture of data in real time, indicating the spatial position of one or more positions on the glass sheet. A non-limiting example is a positional sensor obtained from Rockwell Automation (Allen Bradly), for example, the 42 CM 18 mm LaserSight or the 42EF LaserSight RightSight are suitable positional sensors. The positional sensor can be an imaging sensor, such as one or more CCD and/or laser-light sensor devices housed either together or at separate locations within the chamber 78. CCD and/or laser-light sensor devices sensor devices output 2D images that are processed within the computer or within the device. The images can be used in their 2D form, or can be processed to form a 3D image by the computer to produce a profile of the glass sheet that indicates the real-time spatial position and shape of any portion or point on the glass sheet, and then compares that 2D profile to a reference profile associated with the protocol, and adjusts heating with the gyrotron beam to match the shape profile of the glass sheet with the reference profile. A large variety of position, distance, measurement, displacement, profile, 2D, and 3D sensors, e.g., laser sensors, are commercially available, for example and without limitation from Rockwell Automation (Allen Bradly), Emerson Electric of St. Louis Mo., Schmitt Industries, Inc. of Portland Oreg., and Omron Automation & Safety of Hoffman Estates, Illinois. In any case, the positional sensor is connected to the computer, and data obtained from the positional sensor, optionally in coordination with the IR data described above, and that data is compared to reference data associated with a protocol for bending a particular glass sheet, and the temperature of any portion of the glass sheet can be adjusted using the gyrotron beam.

Figure 16:
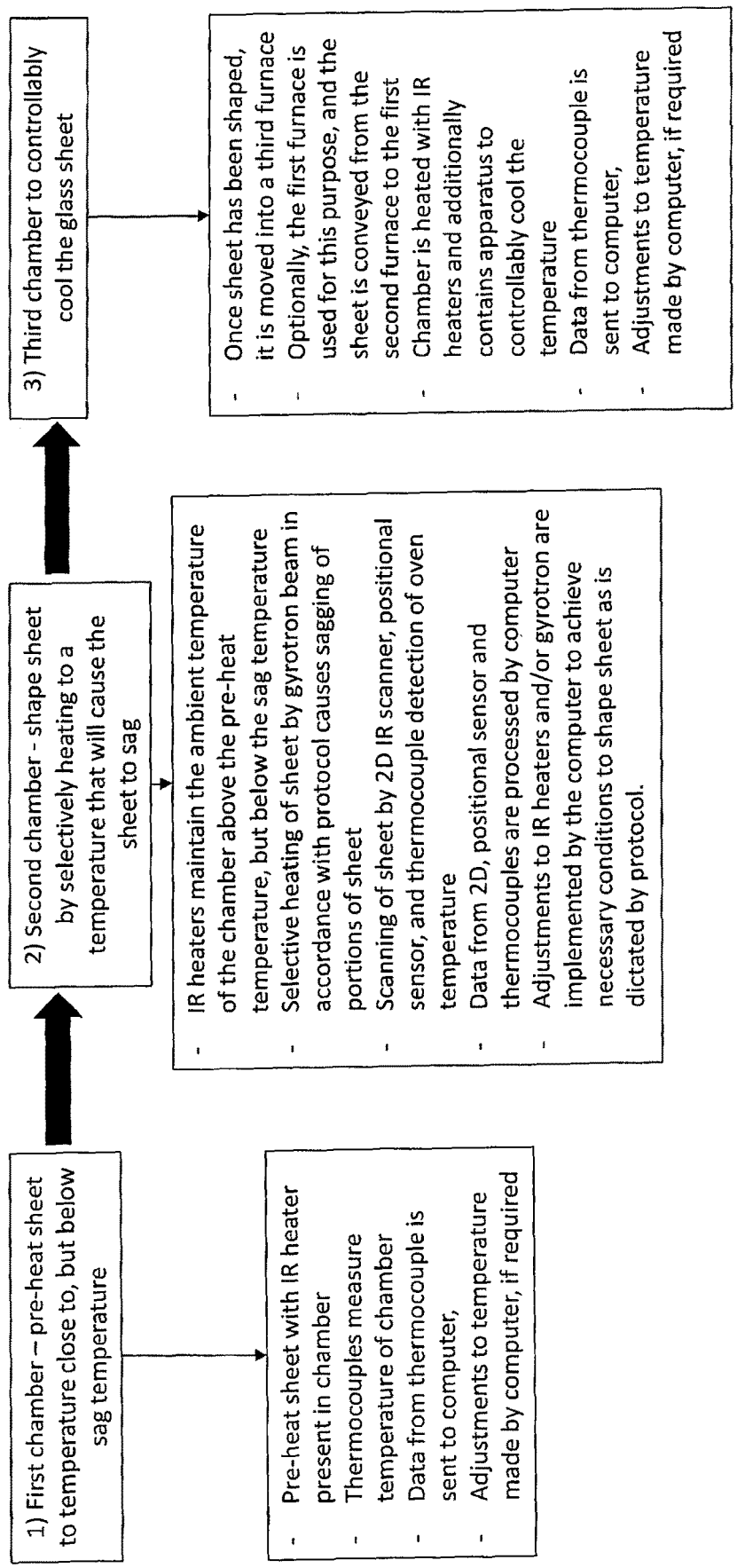
FIG. 16 illustrates a flow diagram of a method of shaping a glass sheet in accordance with the invention.

As shown in FIG. 15, two positional sensors 320, 321, are shown. A composite 3D image or set of images of the glass sheet at any given time point can be generated by a computer implemented process so as to evaluate the shape of the glass sheet at any time point. The computer system generated 3D image, composite image, or set of images of the glass sheet and/or a portion thereof can be compared to values of the reference shape profile of the protocol, and if a deviation from the desired shape stored in the protocol is present, the computer system controls the gyrotron 177 and/or ambient temperature of the second furnace 78, optionally in combination with infrared image data from the 2D infrared imaging sensor 324 to heat the glass sheet, or portions thereof, to shape the glass sheet to meet the requirements of the recipe. FIG. 16 provides a flowchart illustrating a non-limiting embodiment of the methods described herein employing two or three chambers as discussed in relation to FIG. 15.

A gyrotron beam can be manipulated in various ways, such as, altering the path, speed, width, frequency, dwell time at a location, or energy intensity or electrical power of the gyrotron beam. In one example, beam width, energy and frequency is constant, but the location, path, speed and/or dwell time at a location of gyrotron beam are altered to provide a desired heating profile on the sheet.

A "temperature profile" or "temperature distribution profile" refers to the temperature of any portion or portions of a specific glass sheet at any time point or points during the process of heating, bending and cooling that sheet of glass. As used herein, a "reference temperature profile" refers to a temperature distribution profile for any specific glass sheet stored locally in or remotely from the computer system in association with a protocol for bending that specific glass sheet. The reference temperature profile is created or developed by any method, such as by formula and/or trial-and-error, to produce a specific shape of the specific glass sheet. The reference temperature distribution profile for producing a desired shape from a glass sheet will depend on a variety of factors, including, among other factors: the composition of the glass sheet, the desired shape, and the bending iron shapes and functionality. By using a predetermined temperature profile as a reference, and ultimately manipulating the gyrotron system to selectively heat the sheet of glass, an even glass viscosity distribution is produced not only inside of the glass, but throughout the glass. This even distribution of glass viscosity eliminates overheating of the glass surface and as a result, the glass sheet will be formed or bend into required shape with a satisfied optical quality.

The terms "shape profile" refers to the 2D or 3D shape of a glass sheet at any time point or points during the process of heating, bending and cooling a sheet of glass. A "reference shape profile" refers to a shape profile for any specific glass sheet for any time point in the glass forming process stored locally in or remotely from the computer system in association with a protocol for bending that specific glass sheet. The reference shape protocol is created or developed by any method, such as by formula and/or trial-and-error, to produce a specific shape of the specific glass sheet. As with the predetermined heat distribution, the reference shape profile for producing a desired shape from a glass sheet will depend on a variety of factors, including, among other factors: the composition of the glass sheet, the desired shape, the bending iron shapes and functionality.

The invention further contemplates the use of safety equipment to limit or prevent damage to the persons operating the equipment, and/or to prevent or limit damage to the equipment. For example and not limiting to the discussion, the equipment includes an arc detector 330. The arc detector 330 is mounted in the furnace 78 and included a photocell connected to the microprocessor 193 by way of the cable 306. The arcing, as is known in the art, is ionized matter, e.g. but not limited to an air born pocket of dust and appears as a burst of light. The arcing phenomenon is well known in the art and no further discussion is deemed necessary. The photocell of the detector 330 senses the arcing and forwards a signal along the cable 305. The microprocessor 193 forwards a signal along the cable 308 to shut the gyrotron down to prevent damage to the personnel around the furnace 78 and to the gyrotron equipment.

The examples of the invention were discussed to shape two glass sheets. As can now be appreciated, the invention is not limited thereto and the invention can be practiced on one sheet, or more than two sheets, e.g. but not limited to three, four or more sheets.

The invention can be further characterized in the following numbered clauses.

Clause 1: A method of shaping a glass sheet comprising:
a. preheating a glass sheet on a bending iron (70) to a preheating temperature ranging from 600° F. to 1000° F.;
b. increasing the temperature of the sheet to a temperature ranging from greater than the preheating temperature to less than a temperature at which the glass sags;
c. bending the glass sheet by:
i. selectively heating a portion of the glass sheet with a device (177) that produces ultra-high frequency, high-power electromagnetic waves controlled by a computer-implemented protocol to a temperature at which at least a portion of the glass sheet sags;
ii. scanning at least a portion of the glass sheet with one or more thermal sensors (324) at one or more time points during or after the selectively heating step and obtaining from data obtained from the one or more thermal sensors (324) a temperature distribution in at least two dimensions for at least a portion of the glass sheet;
iii. comparing, using a computer-implemented process the obtained temperature distribution to a reference temperature distribution of the computer-implemented protocol; and
iv. selectively heating the glass sheet with the beam (225) of the ultra-high frequency, high-power device (177) controlled by a computer-implemented process to match the obtained temperature distribution with the reference temperature distribution of the computer-implemented protocol.

Clause 2: The method of clause 1, wherein the device producing ultra-high frequency, high-power electromagnetic waves (177) is a gyrotron.

Clause 3: The method of clauses 1 or 2, further comprising repeating steps ii. through iv. of the bending step until the obtained temperature distribution matches the reference temperature distribution of the computer-implemented protocol.

Clause 4: The method of any one of clauses 1-3, in which bending step c. further comprises:
v. obtaining positional data of at least a portion of the glass sheet from one or more positional sensors (320 and 321) at one or more time points during the selective heating step and producing a shape profile using a computer-implemented process for the glass sheet at the one or more time points;
vi. comparing, using a computer-implemented process a produced shape profile to a reference shape profile of the computer-implemented protocol; and vii. selectively heating the glass sheet with the beam (225) of the ultra-high frequency, high-power device (177) controlled by a computer-implemented process to match a shape profile of the glass sheet to the reference shape profile.

Clause 5: The method of clause 4, further comprising repeating steps v. through vii. of the bending step until the obtained shape profile matches the reference shape profile of the computer-implemented protocol.

Clause 6: The method of clauses 4 or 5, wherein comparing steps iii. and vi. are performed substantially concurrently.

Clause 7: The method of any of clauses 4 to 6, in which one or more of the positional sensors (320 and 321) is a camera or charge-coupled device (CCD).

Clause 8: The method of clause 7, wherein the shape profile is a three-dimensional shape profile assembled from data obtained from a plurality of CCDs.

Clause 9: The method of clause 7, wherein the shape profile is a three-dimensional shape profile assembled from data obtained from a plurality of laser-light sensors.

Clause 10: The method of any of clauses 4 to 9, wherein one or more of the one or more positional sensors (320 and 321) are laser-light sensors.

Clause 11: The method of any of clauses 1 to 10, wherein the glass sheet is cut-to-size prior to heating and shaping.

Clause 12: The method of any of clauses 1 to 11, in which the thermal sensor (324) is an IR scanner or and IR imaging sensor, optionally a laser-light sensor.

It will be readily appreciated by those skilled in the art that modifications can be made to the non-limiting embodiments of the invention disclosed herein without departing from the concepts disclosed in the foregoing description. Accordingly, the particular non-limiting embodiments of the invention described in detail herein are illustrative only and are not limiting to the scope of the invention, which is to be given the full breadth of the appended claims and any and all equivalents thereof.

The invention claimed is:

1. A method of shaping a glass sheet comprising:
    a. preheating a glass sheet on a bending iron to a preheating temperature ranging from 600° F. to 1000° F.;
    b. increasing the temperature of the sheet to a temperature ranging from greater than the preheating temperature to less than a temperature at which the glass sags;
    c. bending the glass sheet by:
        i. selectively heating the glass sheet with a device that produces a beam of electromagnetic waves having a frequency of at least 20 GHz and a power of at least 5 kW to a temperature at which at least a portion of the glass sheet sags;
        ii. scanning the glass sheet with one or more thermal sensors at a plurality of time points during the bending of the glass sheet and obtaining a temperature profile of the glass sheet at the plurality of time points during the bending of the glass sheet from data obtained from the one or more thermal sensors including a temperature distribution in at least two dimensions for at least a portion of the glass sheet;

iii. comparing, using a computer-implemented process during the bending of the glass sheet, the obtained temperature profile to a reference temperature distribution;

iv. selectively heating the glass sheet with the beam of the device controlled by a computer-implemented process to match the obtained temperature profile with the reference temperature distribution during the bending of the glass sheet, wherein the reference temperature distribution defines a plurality of temperatures of a plurality of portions of the glass sheet at the plurality of time points during the bending of the glass sheet, wherein a first temperature of the at least a portion of the glass sheet at a first time in the reference temperature distribution during the bending of the glass sheet is different than a second temperature of the at least a portion of the glass sheet at a second time in the reference temperature distribution during the bending of the glass sheet; and v. repeating steps ii. through iv. of the bending step until the obtained temperature profile matches the reference temperature distribution, wherein step c. bending the glass sheet further includes:
obtaining, from the one or more thermal sensors, a first measured temperature of the first portion of the plurality of portions of the glass sheet at the first time point during the bending of the glass sheet;

comparing the first measured temperature to the first reference temperature;

selectively heating the glass sheet with the beam of the device to selectively heat the first portion of the glass sheet to match the first reference temperature during the bending of the glass sheet;

obtaining, from the one or more thermal sensors, a second measured temperature of the first portion of the plurality of portions of the glass sheet at the second time point during the bending of the glass sheet;

comparing the second measured temperature to the second reference temperature;

selectively heating the glass sheet with the beam of the device to selectively heat the first portion of the glass sheet to match the second reference temperature during the bending of the glass sheet;

scanning the glass sheet with one or more positional sensors at the plurality of time points during the bending of the glass sheet to obtain positional data for one or more portions of the glass sheet during bending;

obtaining data from the one or more positional sensors at one or more time points during the bending of the glass sheet;

producing a shape profile for the glass sheet from the obtained data from the one or more positional sensors at the one or more time points;

comparing the obtained shape profile to a reference shape profile concurrently with comparing the obtained temperature profile to the reference temperature distribution; and selectively heating the glass sheet with the beam of the device to selectively heat the glass sheet to match a shape profile of the glass sheet to the reference shape profile.

2. The method of claim 1, wherein the device producing the beam of electromagnetic waves is a gyrotron.

3. The method of claim 1, in which one or more of the positional sensors is a camera or charge-coupled device (CCD).

4. The method of claim 3, wherein the shape profile is a three-dimensional shape profile assembled from data obtained from a plurality of CCDs.

5. The method of claim 3, wherein the shape profile is a three-dimensional shape profile assembled from data obtained from a plurality of laser-light sensors.

6. The method of claim 1, wherein one or more of the one or more positional sensors are laser-light sensors.

7. The method of claim 1, wherein the glass sheet is cut-to-size prior to heating and shaping.

8. The method of claim 1, in which the thermal sensor is an IR scanner or IR imaging sensor.

* * * * *